US007201316B2

(12) United States Patent
Anderson et al.

(10) Patent No.: US 7,201,316 B2
(45) Date of Patent: Apr. 10, 2007

(54) ITEM TRACKING AND PROCESSING SYSTEMS AND METHODS

(75) Inventors: Duane Anderson, Cockeysville, MD (US); Thomas Ramsager, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 11/386,152

(22) Filed: Mar. 21, 2006

(65) Prior Publication Data

US 2006/0159307 A1 Jul. 20, 2006

Related U.S. Application Data

(62) Division of application No. 10/763,440, filed on Jan. 23, 2004, now Pat. No. 7,063,256.

(60) Provisional application No. 60/451,999, filed on Mar. 4, 2003.

(51) Int. Cl.
*G06K 5/00* (2006.01)

(52) U.S. Cl. ...................................... 235/385; 235/382

(58) Field of Classification Search ................ 235/385, 235/383, 380, 382; 342/127, 118, 125, 375, 342/357.03, 132; 701/23, 213, 200
See application file for complete search history.

(56) References Cited

U.S. PATENT DOCUMENTS 3,576,368 A 4/1971 Goetz
3,783,295 A 1/1974 Casler
3,802,548 A 4/1974 Wentz et al.
4,268,165 A 5/1981 Bradmon
4,348,097 A 9/1982 Sippel
4,498,744 A 2/1985 Ealovega et al.
4,515,455 A 5/1985 Northmore (Continued)

FOREIGN PATENT DOCUMENTS

EP 0330184 8/1989

(Continued)

OTHER PUBLICATIONS

Jaeyong Chung et al.; Postrack: A Low Cost Real-Time Motion Tracing System for VR Application; 2001; 10 pages; IEEE Computer Society, USA. cited by other.

(Continued)

*Primary Examiner*—Thien M. Le
(74) *Attorney, Agent, or Firm*—Alston & Bird LLP

(57) ABSTRACT

Systems and methods are provided for processing one or more items. The systems involve a data acquisition device and a display device. At least one data acquisition device and the display device may be mounted on frames having a see-through display and an orientation sensor. An item tracking system tracks the items to be processed. The orientation sensor determines the orientation and position of the wearer of the data acquisition device and the display device such that the wearer of the device may see information about or related to the items in the wearer's field of view. In a see-through display, this information may appear to be proximately superimposed on the item. A method of using the invention includes viewing characteristic information about items on a display device and processing the items in accordance with the characteristic information.

4 Claims, 23 Drawing Sheets

U.S. PATENT DOCUMENTS 4,544,064 A 10/1985 Felder
4,556,944 A 12/1985 Daniels et al.
4,597,495 A 7/1986 Knosby
4,615,446 A 10/1986 Pavie
4,649,504 A 3/1987 Krouglicof et al.
4,711,357 A 12/1987 Langenbeck et al.
4,736,109 A 4/1988 Dvorzsak
4,760,247 A 7/1988 Keane et al.
4,776,464 A 10/1988 Miller et al.
4,788,596 A 11/1988 Kawakami et al.
4,805,778 A 2/1989 Nambu
4,832,204 A 5/1989 Handy et al.
4,874,936 A 10/1989 Chandler et al.
4,877,949 A 10/1989 Danielson et al.
4,896,029 A 1/1990 Chandler et al.
4,921,107 A 5/1990 Hofer
4,940,925 A * 7/1990 Wand et al. ................ 318/587
4,992,649 A 2/1991 Mampe et al.
5,003,300 A 3/1991 Wells
5,095,204 A 3/1992 Novini
5,101,983 A 4/1992 Scata
5,115,121 A 5/1992 Bianco et al.
5,128,528 A 7/1992 Heminger
5,140,141 A 8/1992 Inagaki et al.
5,141,097 A 8/1992 Oiry et al.
5,165,520 A 11/1992 Herve et al.
5,185,822 A 2/1993 Miura
5,190,162 A 3/1993 Hartlepp
5,208,449 A 5/1993 Eastman et al.
5,245,172 A 9/1993 Esslinger et al.
5,263,118 A 11/1993 Cornelison
5,281,957 A 1/1994 Schoolman
5,305,244 A 4/1994 Newman et al.
5,308,960 A 5/1994 Smith et al.
5,309,190 A 5/1994 Shinohara et al.
5,311,999 A 5/1994 Malow et al.
5,323,327 A 6/1994 Carmichael et al.
5,327,171 A 7/1994 Smith et al.
5,329,469 A 7/1994 Watanabe
5,353,091 A 10/1994 Ishida et al.
5,380,994 A 1/1995 Ray
5,431,288 A 7/1995 Nishijima et al.
5,438,517 A * 8/1995 Sennott et al. .............. 701/213
5,450,596 A 9/1995 Felsenstein
5,463,432 A 10/1995 Kahn
5,481,096 A 1/1996 Hippenmeyer et al.
5,481,298 A 1/1996 Sasaki et al.
5,485,263 A 1/1996 Bjorner et al.
5,491,510 A 2/1996 Gove
5,506,912 A 4/1996 Nagasaki et al.
5,510,603 A 4/1996 Hess et al.
5,515,447 A 5/1996 Zheng et al.
5,566,245 A 10/1996 Zheng et al.
5,567,927 A 10/1996 Kahn et al.
5,607,187 A 3/1997 Salive et al.
5,620,102 A 4/1997 Finch, Jr.
5,642,442 A 6/1997 Morton et al.
5,667,078 A 9/1997 Walach
5,671,158 A 9/1997 Fournier et al.
5,677,834 A 10/1997 Mooneyham
5,682,030 A 10/1997 Kubon
5,687,850 A 11/1997 Speckhart et al.
5,695,071 A 12/1997 Ross et al.
5,697,504 A 12/1997 Hiramatsu et al.
5,699,440 A 12/1997 Carmeli
5,725,253 A 3/1998 Salive et al.
5,742,263 A 4/1998 Wang et al.
5,770,841 A 6/1998 Moed et al.
5,812,257 A 9/1998 Teitel et al.
5,844,601 A 12/1998 McPheely et al.
5,844,824 A 12/1998 Newman et al.
5,857,029 A 1/1999 Patel
5,869,820 A 2/1999 Chen et al.
5,900,611 A 5/1999 Hecht
5,920,056 A 7/1999 Bonnet
5,923,017 A 7/1999 Bjorner et al.
5,933,479 A 8/1999 Michael et al.
5,943,476 A 8/1999 Dougherty et al.
5,959,611 A 9/1999 Smailagic et al.
6,046,712 A 4/2000 Beller et al.
6,060,992 A 5/2000 Huang et al.
6,061,644 A 5/2000 Leis
6,064,354 A 5/2000 DeLuca
6,064,476 A 5/2000 Goltsos
6,064,749 A 5/2000 Hirota et al.
6,085,428 A 7/2000 Casby et al.
6,094,509 A 7/2000 Zheng et al.
6,094,625 A 7/2000 Ralston
6,114,824 A 9/2000 Watanabe
6,122,410 A 9/2000 Zheng et al.
6,133,876 A * 10/2000 Fullerton et al. ........... 342/375
6,148,249 A 11/2000 Newman
6,172,657 B1 1/2001 Kamakura et al.
6,189,784 B1 2/2001 Williams et al.
6,204,764 B1 3/2001 Maloney
6,236,735 B1 5/2001 Bjorner et al.
6,243,054 B1 6/2001 DeLuca
6,243,620 B1 6/2001 Robinson et al.
6,244,015 B1 6/2001 Ito et al.
6,282,462 B1 8/2001 Hopkins
6,317,039 B1 11/2001 Thomason
6,330,356 B1 12/2001 Sundareswaran et al.
6,342,915 B1 1/2002 Ozaki et al.
6,352,349 B1 3/2002 Braginsky et al.
6,353,313 B1 3/2002 Estep et al.
6,377,401 B1 4/2002 Bartlett
6,411,266 B1 6/2002 Maguire, Jr. et al.
6,417,969 B1 7/2002 DeLuca et al.
6,437,823 B1 8/2002 Zhang
6,445,175 B1 9/2002 Estep et al.
6,526,352 B1 * 2/2003 Breed et al. ................ 701/213
6,661,335 B1 12/2003 Seal
6,714,121 B1 3/2004 Moore
6,799,099 B2 * 9/2004 Zeitler et al. ................. 701/23
2001/0032805 A1 10/2001 Lawandy et al.
2001/0033685 A1 10/2001 Parry
2002/0063159 A1 5/2002 Wilz, Sr. et al.
2002/0072897 A1 6/2002 Skonberg et al.
2002/0075201 A1 6/2002 Sauer et al.
2002/0082498 A1 6/2002 Wendt et al.
2002/0105484 A1 8/2002 Navab et al.
2002/0113756 A1 8/2002 Tuceryan et al.
2003/0034392 A1 2/2003 Grimme et al.
2003/0043073 A1 3/2003 Gray et al.
2003/0083076 A1 5/2003 Pradhan et al.
2003/0106771 A1 6/2003 Takizawa
2004/0004119 A1 1/2004 Baldassari et al.
2004/0008113 A1 1/2004 Pradhan et al.
2004/0016684 A1 1/2004 Braginsky et al.
2004/0069854 A1 4/2004 Good et al.
2004/0148518 A1 7/2004 Grundback et al.
2004/0150387 A1 8/2004 Lyon et al.
2004/0153539 A1 8/2004 Lyon et al.
2004/0178269 A1 9/2004 Pradhan et al.
2004/0178270 A1 9/2004 Pradhan et al.
2004/0201857 A1 10/2004 Foxlin
2005/0046608 A1 3/2005 Schantz et al.

FOREIGN PATENT DOCUMENTS

EP 1 128 315 8/2001
FR 2676941 12/1992
JP 56-004870 1/1981
WO WO 98/32545 7/1998

| | | |
|---|---|---|
| WO | WO 00/52563 | 9/2000 |
| WO | WO 00/59648 | 10/2000 |
| WO | WO 00/59649 | 10/2000 |
| WO | WO 03/050626 | 6/2003 |

OTHER PUBLICATIONS

International Search Report from International Application No. PCT/US2004/043264 dated Sep. 21, 2005. cited by other.

International Search Report from corresponding International Application No. PCT/US2005/003779 dated Mar. 2, 2005. cited by other.

Susan Kuchinskas; HP: Sensor Networks Next Step for RFID; Internetnews.com; http://www.internetnews.com/ent-news/article.php/3426551; Oct. 26, 2004; pp. 1-4. Accessed Mar. 16, 2005. Applicant makes no admission that this reference constitutes prior art. cited by other.

Citation, 202 F.3d 1340; 53 U.S.P.Q.2d 1580, United States Court of Appeals, *Winner International Royalty Corporation* vs. *Ching-Rong Wang*, Defendant; No. 98-1533; Jan. 27, 2000, 14 pages. cited by other.

IBM Corp, "Parcel Position Scanning and Sorting System," IBM technical Disclosure Bulletin, vol. 15 No. 4, Sep. 1972, pp. 1170-1171, XP002065579 US. cited by other.

Yamada Yasuo, Inventor; Nippondenso Co. Ltd, Applicant; "Optical Information Reader [Abstract Only]," Patent Abstracts of Japan, Publication Date Aug. 9, 1996, Publication No. 0820 2806 (Abstracts published by the European Patent Officce on Dec. 26, 1996, vol. 1996, No. 12). cited by other.

International Search Report from corresponding International Application No. PCT/US03/22922 dated Jul. 23, 2003. cited by other.

* cited by examiner

Image Without Filter

Image With Filter

ITEM TRACKING AND PROCESSING SYSTEMS AND METHODS

CROSS-REFERENCE TO RELATED APPLICATIONS

This application is a division of U.S. application Ser. No. 10/763,440, filed Jan. 23, 2004 now U.S. Pat. No. 7,063,256, which is hereby incorporated herein in its entirety by reference. U.S. application Ser. No. 10/763,440 further claims the benefit of U.S. Provisional Application No. 60/451,999, filed Mar. 4, 2003, which is hereby fully incorporated herein in its entirety and made a part hereof.

BACKGROUND OF THE INVENTION

1. Field of the Invention

The field of the present invention includes the tracking and processing of items. In particular, the present invention involves the communication of sorting instructions to a person during the processing of parcels.

2. Description of Related Art

The manual sorting or item-processing environment is readily described as a wide range of event-based stimuli with physical dynamic activity. For example, the current state of parcel processing is one where people who process parcels within a manual sorting facility are continually reading package information from each package's label. Given the acquired information, a range of decision types and activity are possible for each job type (the "per-package decision process"). Items are moved between job positions in sorting facilities using a flexible array of conveyor belts, slides, trays, bags, carts, etc. Large-scale item processors, such as for example, UPS, have a substantial investment in the numerous facilities, plant equipment configurations, and training needed to provide the current state of the process.

Any attempt to use technology to aid the per-item decision process is hampered by the high cost of inserting technology into existing manual package-processing environments. Challenges with the use of technology are also present in the form of space constraints as well as the flow of items in a processing environment.

The biggest cost impacts of technology insertion are in providing stations to electronically acquire or read item data and providing stations to display or generate item sorting and/or processing instructions. The difficulty in minimizing these costs is that the accumulated exception rates for item processing is often very high. Factors that contribute to this exception rate include errors in conventional label codes scanning, address validation problems, package data availability, and package dimensional conformity. Therefore, a large expense is incurred in item processing by the need and processes of exception handling capabilities.

Many conventional item-processing systems utilize on-the-floor item processing exception areas where an exception item is physically removed from the processing system and handled on an expensive and labor intensive individual basis. These on-the-floor areas may adversely impact the processing facility's balance of facility configuration, productivity, methods and throughput.

In some instances, off-the-floor exception handling may be able to reduce physical exception handling. These systems may use item acquire and re-acquire stations whereby instances of label acquisition exceptions and instruction-change exceptions are handled electronically rather than manually. However, the use of off-the-floor exception areas enabled by fixed item acquire and re-acquire stations imposes an early processing deadline and does not allow for instruction changes after an item has passed the re-acquire station. Also, this method still requires considerable on-the-floor equipment for both, acquire and re-acquire stations.

Embodiments of the present invention overcome many of the challenges present in the art, some of which are presented above.

BRIEF SUMMARY OF THE INVENTIONS

Embodiments of the present invention provide computer-assisted decision capability for the processing of items. In a specific application, an embodiment of the present invention tracks and provides processing instructions for items within an item processing facility's handling processes.

In other embodiments, items are tracked and information about one or more items is provided to a person based on the location of the person and/or the location of the one or more items.

Generally, an embodiment of the invention involves a system whereby item handling personnel and supervisors wear a set of see-through display lenses that superimpose relevant messages proximately about or over real tracked objects in the field of view. These lenses are attached to an information gathering device that captures and decodes information about the item such as, for example, label images, and an orientation and position device that determines the orientation and position of the wearer so that it may be determined what items are in the field of view.

Embodiments of the present invention involve a data acquisition and display device comprised of an information gathering device to capture data from an object, a beacon detection device to capture information about the orientation and position of a wearer, and a transparent heads-up display showing instructions related to the object, each in communication with one or more computers.

Another aspect of the present invention is a tracking system such as, for example, an optical tracking system comprised of two or more fixed detectors such as, for example, fixed cameras, one or more energy sources such as, for example, a light source, a passive beacon that is reactive to energy from the energy source, and a computer. The computer determines the location of the passive beacon from the information received from the fixed detectors as the detectors receive reflected or transmitted energy from the passive beacon.

Yet another aspect of the present invention involves an item tracking system comprised of an information gathering device such as, for example, an image device to capture data from an object, a beacon detection device to capture information about the orientation and position of a wearer, a tracking system to follow a passive beacon applied to each object, and a transparent heads-up display showing information related to the object, each in communication with one or more computers.

One aspect of the invention includes systems and methods for the use of tracking technology such as, for example, optical tracking technology, to follow the progress of an object moving through a complex facility in real time such as, for example, the optical tracking of parcels or parts on an assembly line or through a warehouse.

Another aspect of the invention includes systems and methods for the use of a transparent heads-up display to convey instructions or information to a person when looking at a certain object. Such instructions could be for package handling, baggage handling, parts assembly, navigation through marked waypoints, item retrieval and packaging, inventory control, and the like.

Yet another aspect of the invention is systems and methods for calibrating an optical tracking system using fixed cameras and passive beacons.

Another aspect of the present invention provides a system for processing items. The system is comprised of a tracking system that is configured to provide location information for each of a plurality of items on a surface and a display device. The display device is for viewing characteristic information for each of the plurality of items at their respective locations. In one embodiment, the characteristic information is positioned to indicate the relative position of the item on the surface, including putting the characteristic information substantially proximate to a representation of the item. In another embodiment, only certain characteristic information such as, for example, a zip code of a package, is displayed instead of the package at the package's position. Items may be singulated or non-singulated.

These and other aspects of the various embodiments of the invention are disclosed more fully herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 20:
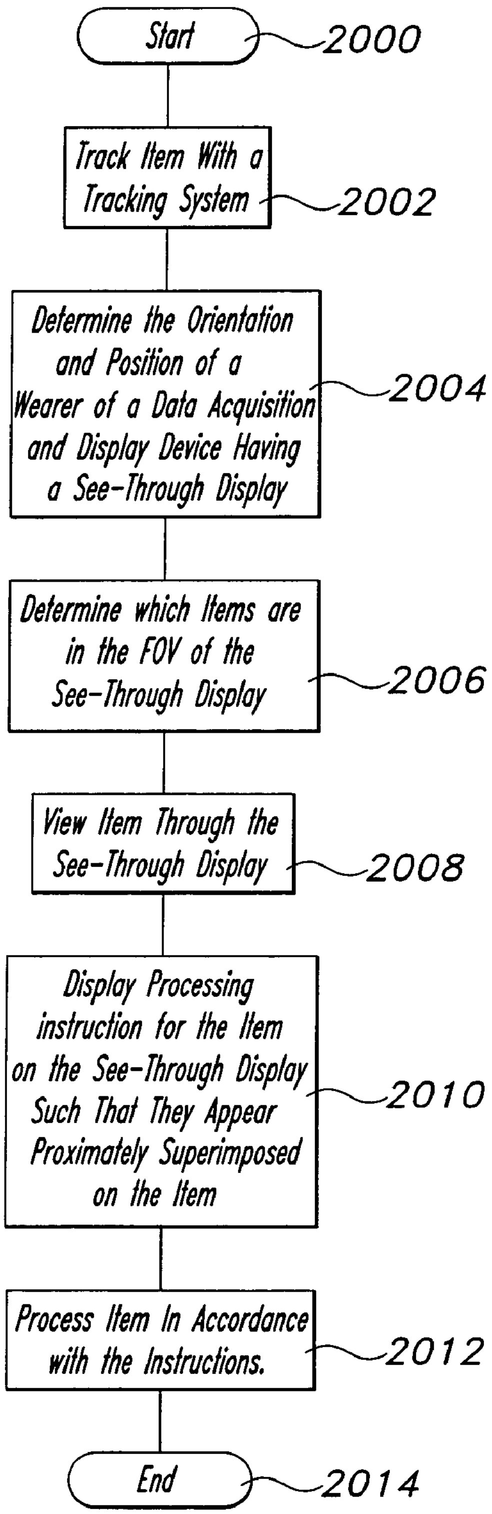
Figure 21:
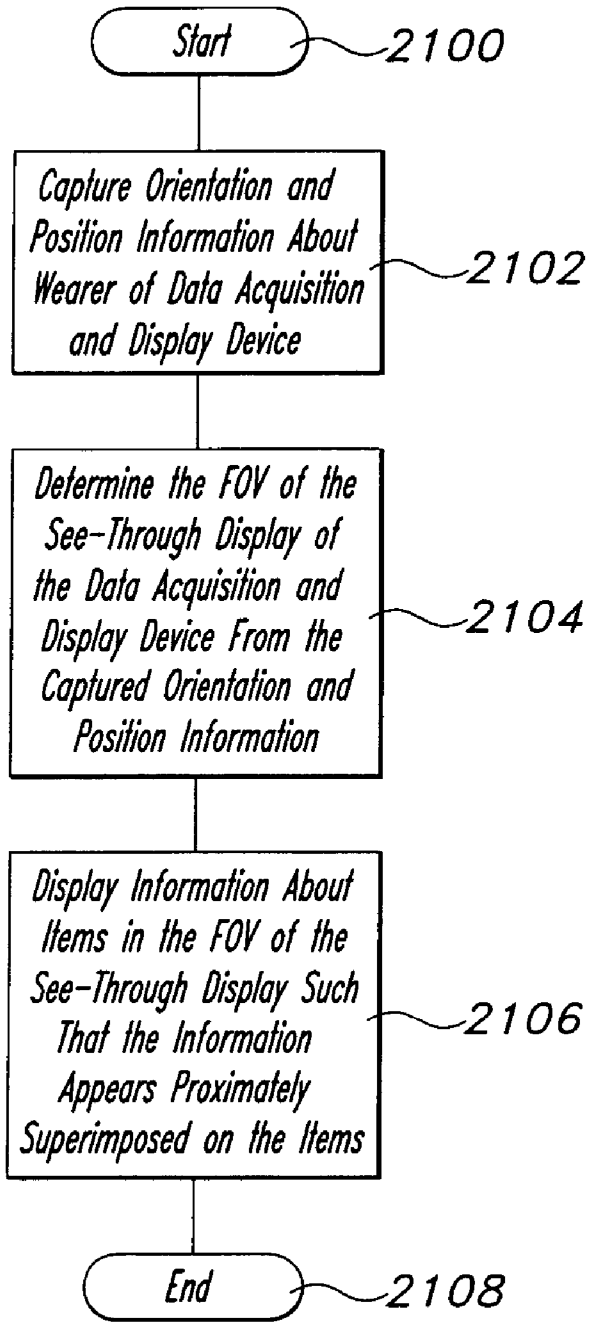
Figure 22:
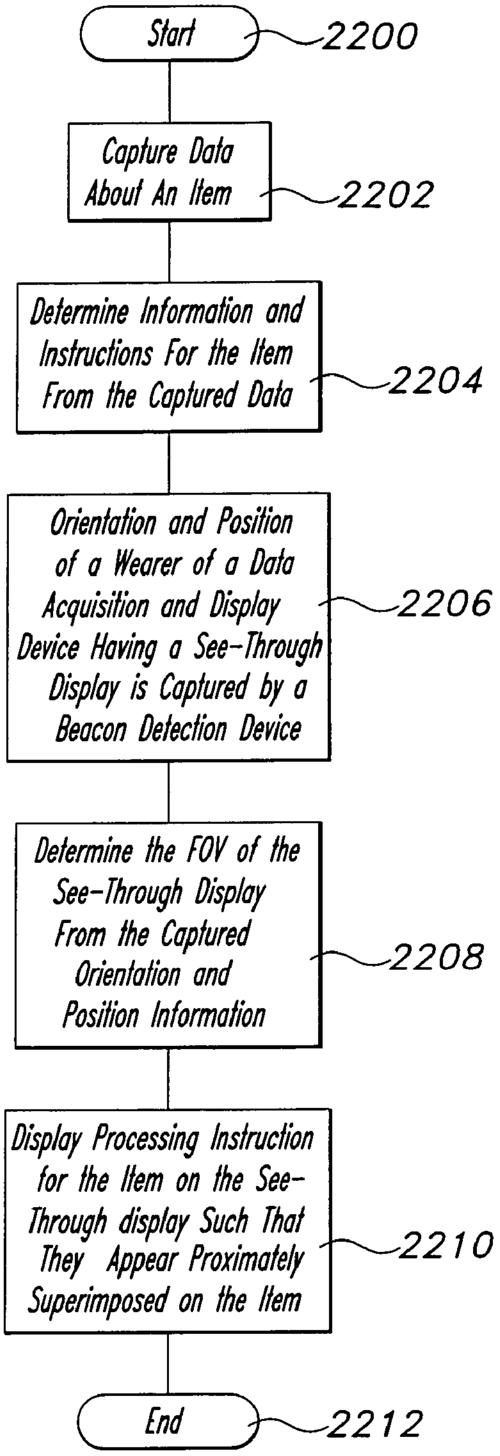
Figure 23:
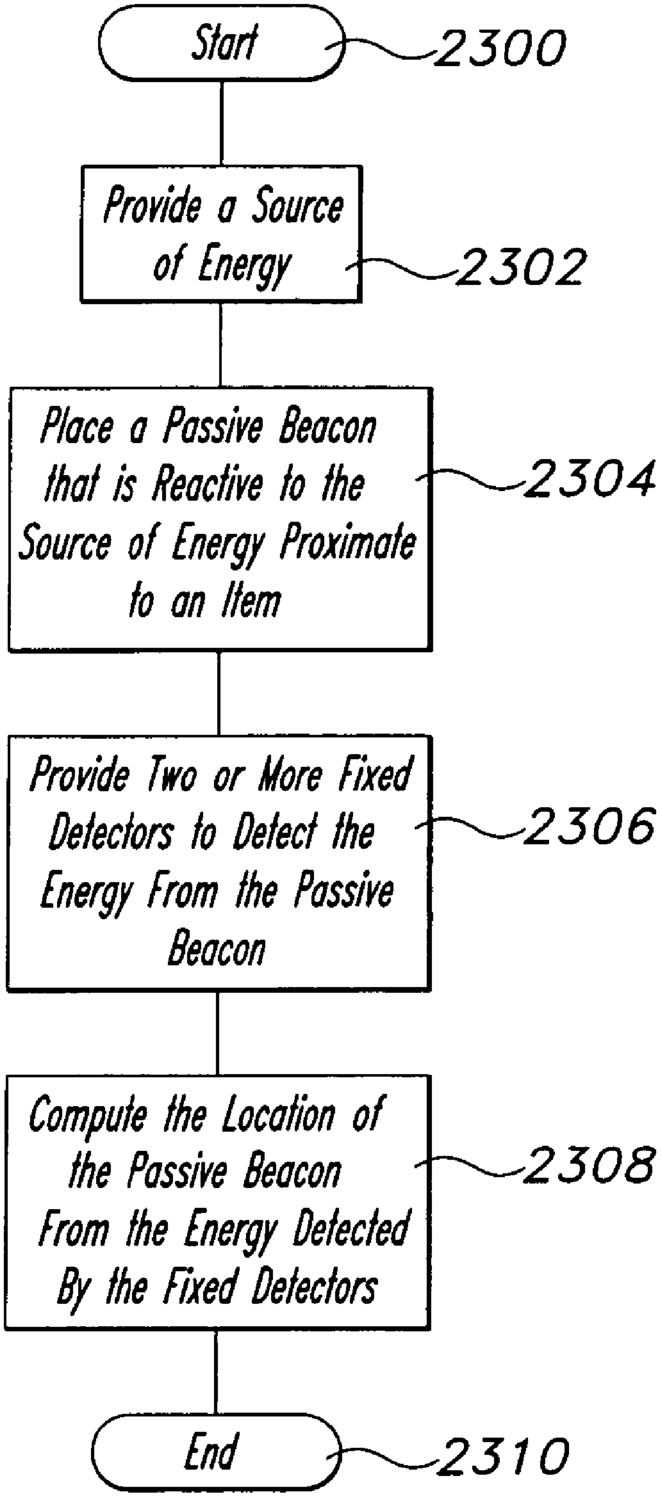
Figure 24:
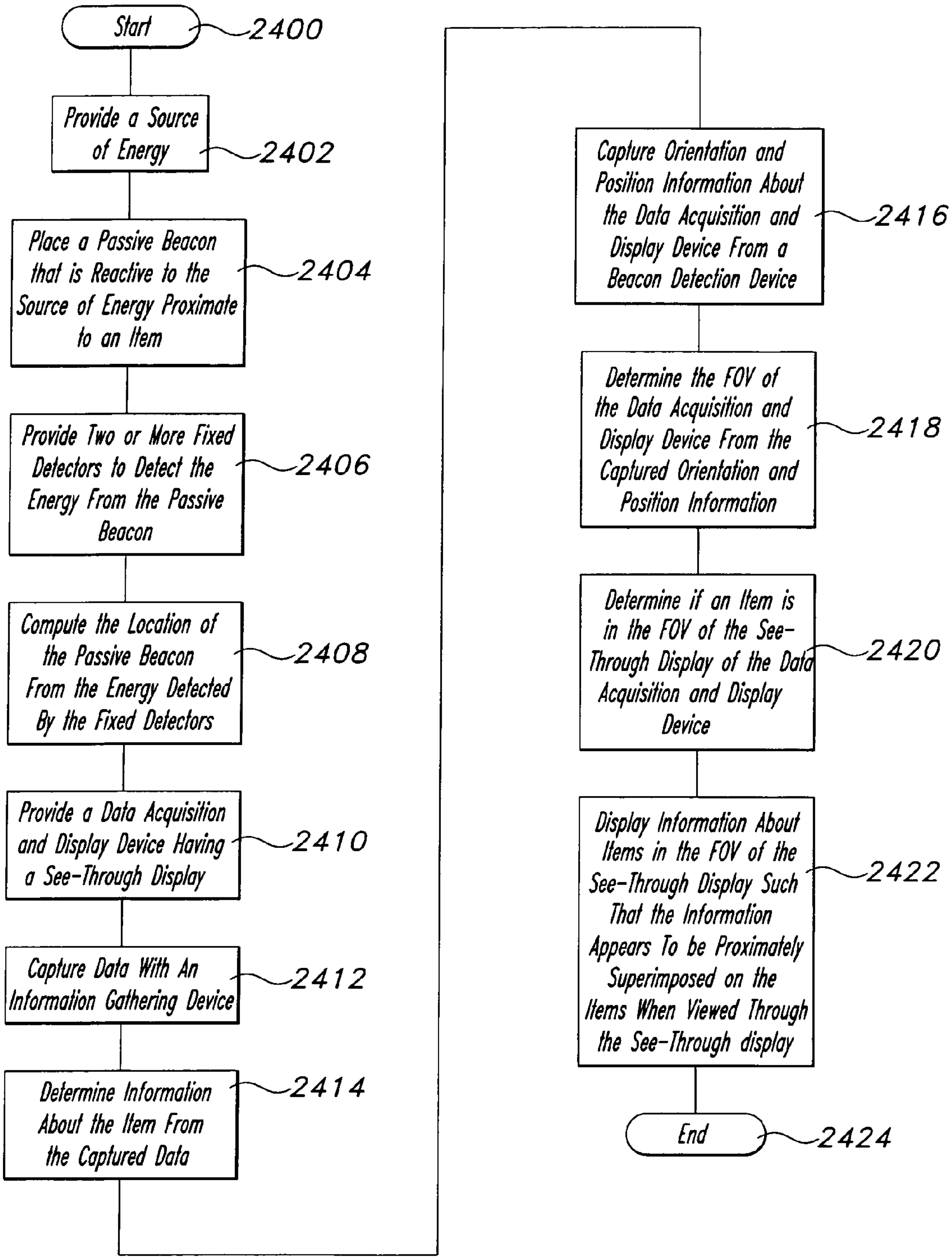
Figure 25:
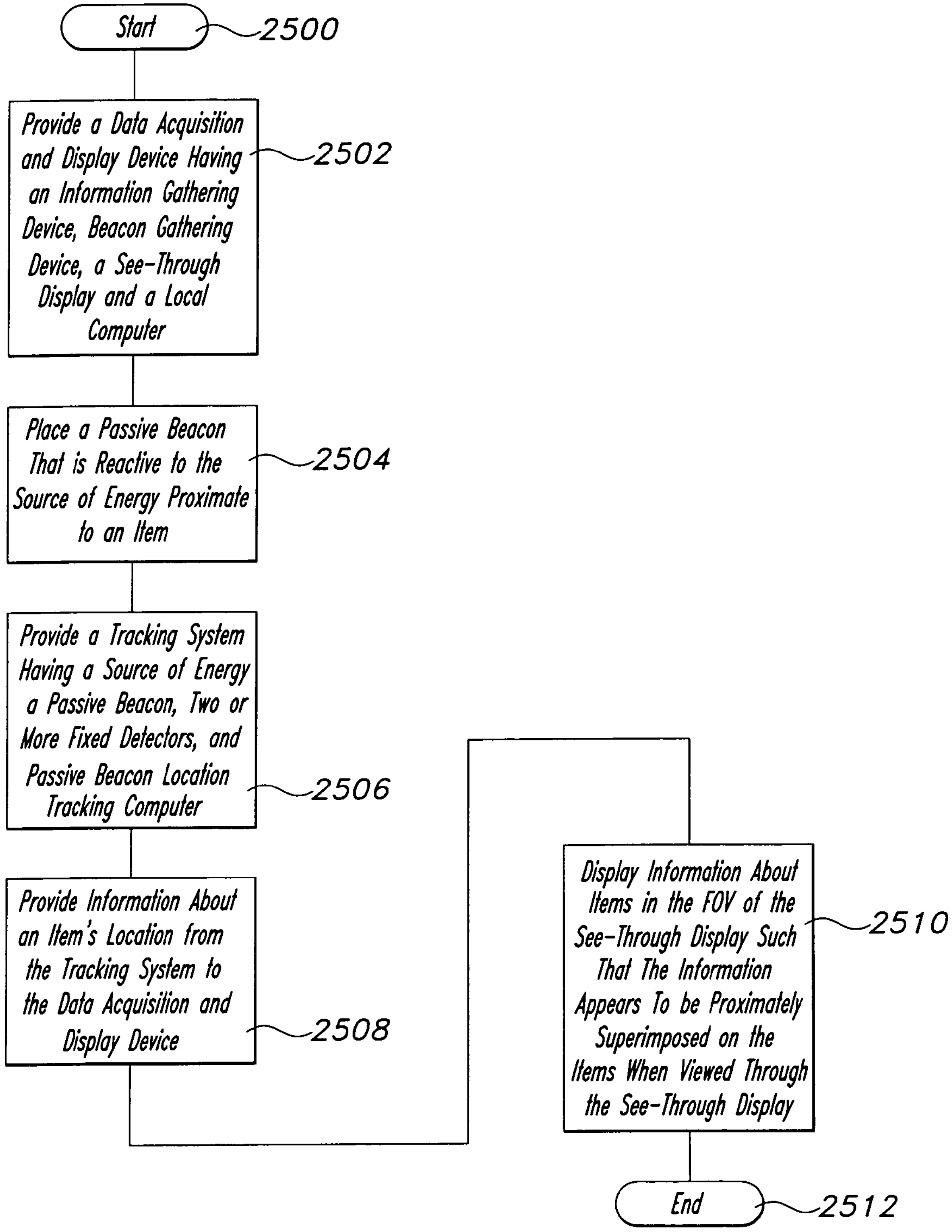
Figure 26:
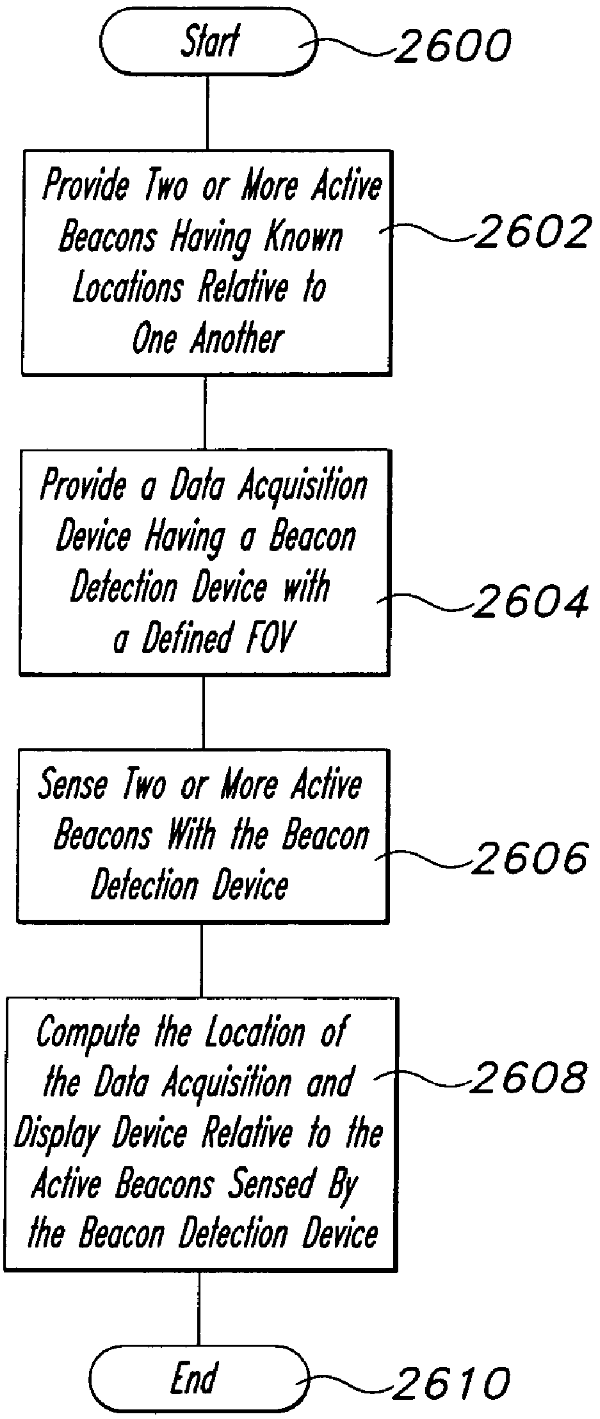

FIG. 20 also is a flowchart describing the steps for a method of processing an item in another embodiment of the invention;

FIG. 21 is a flowchart describing a method of displaying information about one or more items in a see-through display of a data acquisition and display device in an embodiment of the invention;

FIG. 22 is a flowchart that describes a method of displaying information in a see-through display of a data acquisition and display device in another embodiment of the invention;

FIG. 23 is a flowchart describing a method of tracking one or more items in an embodiment of the invention;

FIG. 24 is a flowchart describing a method of tracking one or more items in another embodiment of the invention;

FIG. 25 is a flowchart describing a method of tracking items in an embodiment of the invention; and FIG. 26 is a flowchart that describes a method of computing the orientation and position of a wearer of a data acquisition and display device in an embodiment of the invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The embodiments of the present invention may be described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Generally, the concepts of the various embodiments of the invention relate to systems and methods for the processing of singulated and non-singulated items. The embodiments of the systems and methods generally involve two sub-systems, a data acquisition and display system and a tracking system such as, for example, an optical tracking system. In one embodiment the data acquisition and display system includes a set of goggles that have one or more information gathering devices such as, for example, cameras, radio-frequency identification (RFID) readers, barcode readers, RF receivers, etc., or combinations thereof for data capture and a transparent heads-up display for displaying data and tracking items. Items may be singulated or non-singulated and they may be stationary or moving. Data capturing and tracking for this embodiment is initiated by pointing at least one of the information gathering devices on the goggles toward a label or tag on an item and initiating tracking of the item by, for example, uncovering a passive beacon, such as, for example, a retro-reflective dot proximately located on each item. The data captured by the goggle's image gathering device is transmitted via a network to a local computer that records item data and determines the instructions to be displayed in the heads-up display. The local computer may interface with one or more servers and business applications.

In other embodiments, the data acquisition and display may be performed by more than one device. For instance, information gathering devices may be mounted on the goggles, or they may be separate from the goggles such as wand-mounted or fixed barcode readers, RFID readers, cameras, etc. Furthermore, in some embodiments, the display may be separate from the goggles, as it may be a fixed display monitor or panel as are known in the art, or it may be a display affixed to a person by means other than goggle. The display may be of the sort that items are viewed through the display and characteristic information about the items is displayed on or substantially proximate to the viewed items. In other instances, a representation of one or more items may be displayed on the display and characteristic information about the one or more items displayed on or proximate to the representations. Furthermore, the characteristic information may, in some instances, serve as the representation of the item. For example, in a package-handling application, the zip-code of the packages may serve as the representation of the item, while also serving as characteristic information about the item.

One embodiment of the tracking system is an optical tracking system that includes an array of fixed cameras, which track the passive beacons through a sorting and loading facility and a passive beacon location tracking (PBLT) computer. When a user looks toward a package through the goggles, one of the goggle's information gathering devices or a sensor device such as a beacon detection device picks up at least two of the active beacon beams. By picking up these beams, the local computer is able to determine the location of the user and the user's position. The optical tracking system is able to track the location of the uniquely-identified passive beacons and associate information with each passive beacon. The PBLT computer sends the information back to the goggle's local computer via a network, such as for example, a wireless network. Therefore, items in the wearer's field of view will have their information appear on the heads-up display and will generally appear to be superimposed proximately about or over the real objects in the wearer's field of view. Such superimposed information may be applied to the items in a sequential or random fashion, or it may be applied to all items in the wearer's field of view or work area. In one embodiment, only information relevant to that particular wearer will be superimposed on the items. Items may be singulated or non-singulated in the wearer's field of view.

Other embodiments of the tracking system may involve the use of transponders such as, for example, RFID tags that are attached to or associated with items to be tracked and where the location of such transponders is monitored by fixed detectors, as may be known in the art. For instance, U.S. Pat. No. 6,661,335, issued on Dec. 9, 2003 to Seal, fully incorporated herein and made a part hereof, describes a system and method for determining the position of a RFID transponder with respect to a sensor.

One embodiment of a data acquisition and display system of the invention is comprised of a set of goggles having a see-through display. The term "goggles" is used generically and is meant to include any form of lenses (prescription or otherwise), shield or shields or even empty frames or other head or body-mounted apparatus capable of having a see-through display and one or more information gathering devices or sensors attached thereto. The see-through display is capable of displaying text and/or images without completely obstructing a wearer's line of sight. It may be supported on the head or other part of the body, or in the alternative on a structure that allows a user to view a field of view through the display. The data acquisition and display system in some embodiments is comprised of one or more information gathering devices such as, for example, cameras that comprise an image-capture camera for acquiring label images and a beacon detection device that is used to acquire signals from active beacons and track orientation and that are attached to the goggles. In other embodiments, the label images are acquired by other means such as a fixed image acquisition station located over or adjacent to a conveyor belt. The goggles, in some embodiments, may include one or more orientation sensors that are used to track a wearer's orientation during times of rapid head movement.

The see-through display, information gathering devices and orientation sensor(s) (if included) communicate with a local computer via a network that may be wired, wireless, optical or a combination thereof. The local computer may communicate with one or more other computers and/or servers over a network and via a network interface. This network may also be wired, wireless, optical or a combination thereof.

In other embodiments, the information gathering devices may be RFID readers, barcode readers, RF receivers or transceivers, or combinations thereof.

The tracking system includes active beacons that provide a reckoning reference for the system to determine position and orientation of wearers of the data acquisition and display system and passive beacons that are attached to or associated with each item of interest to provide a "registration" trigger for each item and to reduce the complexity of the task of three-dimensional tracking. The tracking system further includes fixed detectors such as, for example, fixed cameras that are used to track an item associated with a passive beacon. An energy source such as, for example, a light source is attached to each fixed detector and energy is reflected back or returned to the fixed detector by the passive beacons so that the fixed detectors will eliminate all items except those associated with the passive beacons. In one embodiment the fixed detector is a fixed camera and the energy source is a light. A filter on each fixed camera passes reflected light from passive beacons such that it provides an image that only shows the passive beacons associated with each item of interest.

The tracking system provides information to a server or other processor that communicates with the local computer via a network and may provide information and instructions to, or receive information and instructions from, one or more business applications.

Figure 1:
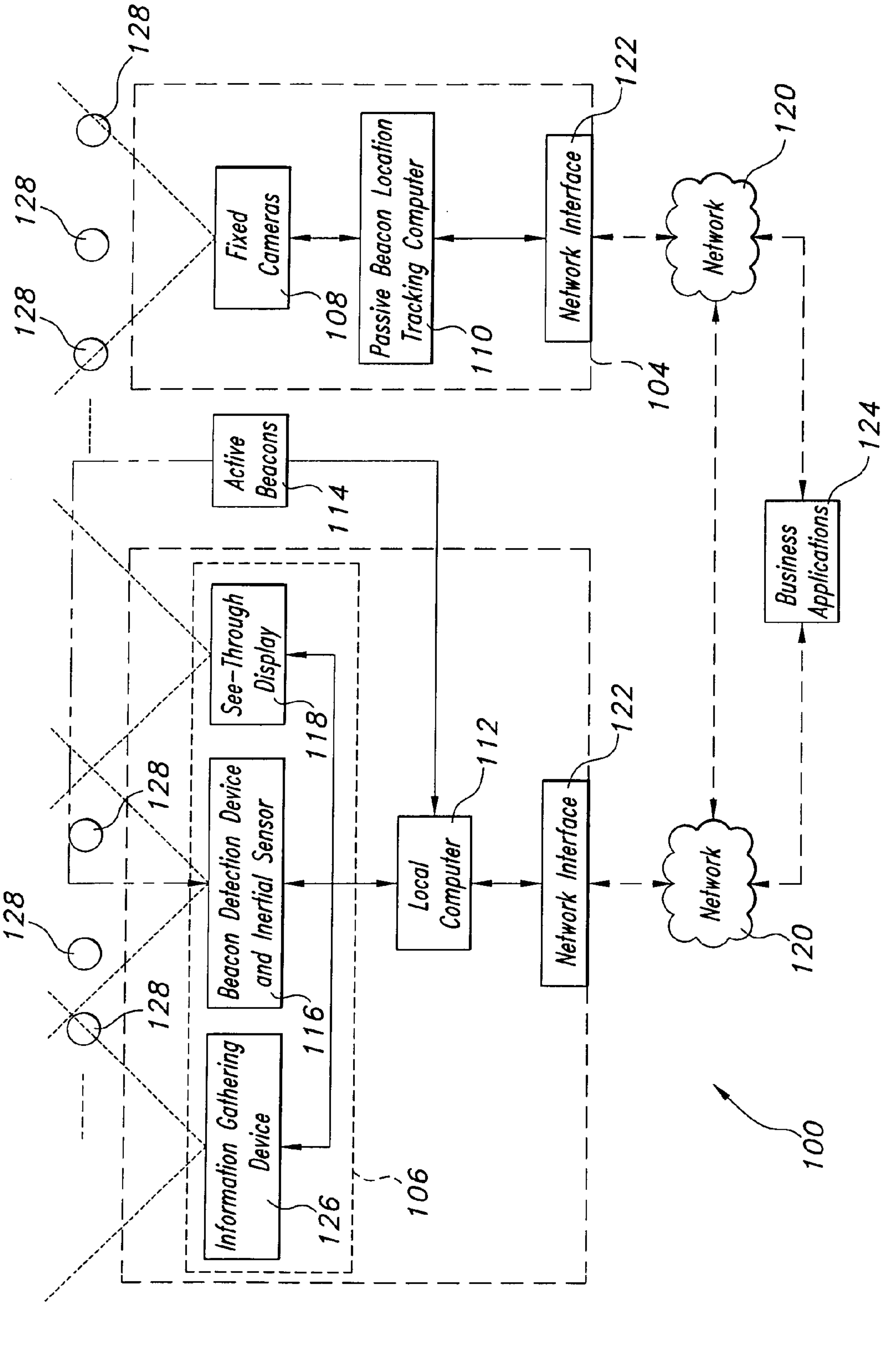
FIG. 1 is an exemplary block diagram of an embodiment of the system of the invention.

FIG. 1 is a block diagram of an embodiment of the system 100 of the invention. This embodiment is comprised of a wearable data acquisition and display device 102 combined with an optical tracking system 104. The optical tracking system 104 has the ability to track items that are associated with passive beacons 128 as such items move throughout a facility.

Components of the data acquisition and display device 102 are adapted to attach to a set of frames, lenses, shields, goggles, etc. (hereinafter generically referred to as "goggles") 106, which provides the ability to superimpose information about items that are being tracked proximately about or over the real objects (i.e., tracked items) that are within the goggle wearer's field of view. This is because the optical tracking system 104 tracks positional information about items or objects that have passive beacons 128 associated with such items. This tracking occurs through the use of fixed cameras 108 and a PBLT computer 110. The item tracking information is provided to the data acquisition and display device 102. The data acquisition and display device 102 has a local computer 112 that calculates the wearer's position and orientation. This is accomplished through the use of active beacons 114 that have known, fixed locations and unique "signatures" and a beacon detection device 116 such as, for example, a beacon camera and inertial sensor that comprise components of the data acquisition and display device 102. The local computer 112 knows the location of the fixed active beacons 114 and from the active beacons 114 that are in the beacon detection device's 116 field of view (FOV) is able to determine a wearer's position and orientation. Information about tracked items is provided to the local computer 112 from the optical tracking system 104 via one or more networks 120 and network interfaces 122. Therefore, certain information about tracked items that are in the wearer's field of view can be displayed on a see-through display 118. This information may appear to be superimposed proximately about or on the actual item because of the see-through feature of the display 118.

The information displayed on the see-through display 118 about the tracked item is determined by business applications 124 that interface with both, the data acquisition and display device 102 and the optical tracking system 104 via the networks 120. For example, these business applications 124 may cause sorting and loading instructions to appear on the items so that wearer's of the data acquisition and display device 102 do not have to read each item's label or have to read instructions provided by nearby screens, panels, CRTs, etc. Information about the tracked items may be obtained by an information gathering device 126 such as, for example, an image camera that obtains an image of the item's label and registers the item for tracking by the optical tracking system 104. The label image may be provided to the local computer 112 from the image device 126, where it is decoded and provided to the business applications 124 via the networks 120. The business applications 124 may combine the label data with other information and indicate to the local computer 112 what information is to be displayed in the see-through display 118.

In other embodiments, the information about the tracked items may be obtained by an information gathering device 126 such as, for example, a radio frequency identification (RFID) reader. In one embodiment, the item's label may be an RFID tag. As previously described, the information gathering device 126 obtains information from an item's label and registers the item for tracking by the optical tracking system 104. The label information may be provided to the local computer 112 from the information gathering device 126, where it is decoded and provided to the business applications 124 via the networks 120. The business applications 124 may combine the label data with other information and indicate to the local computer 112 what information is to be displayed in the see-through display 118.

In other embodiments, other tracking systems may be utilized. For instance, a tracking system that tracks RFID tags by the use of fixed RFID readers may be used in place of an optical tracking system.

Data Acquisition and Display Device

Figure 2:
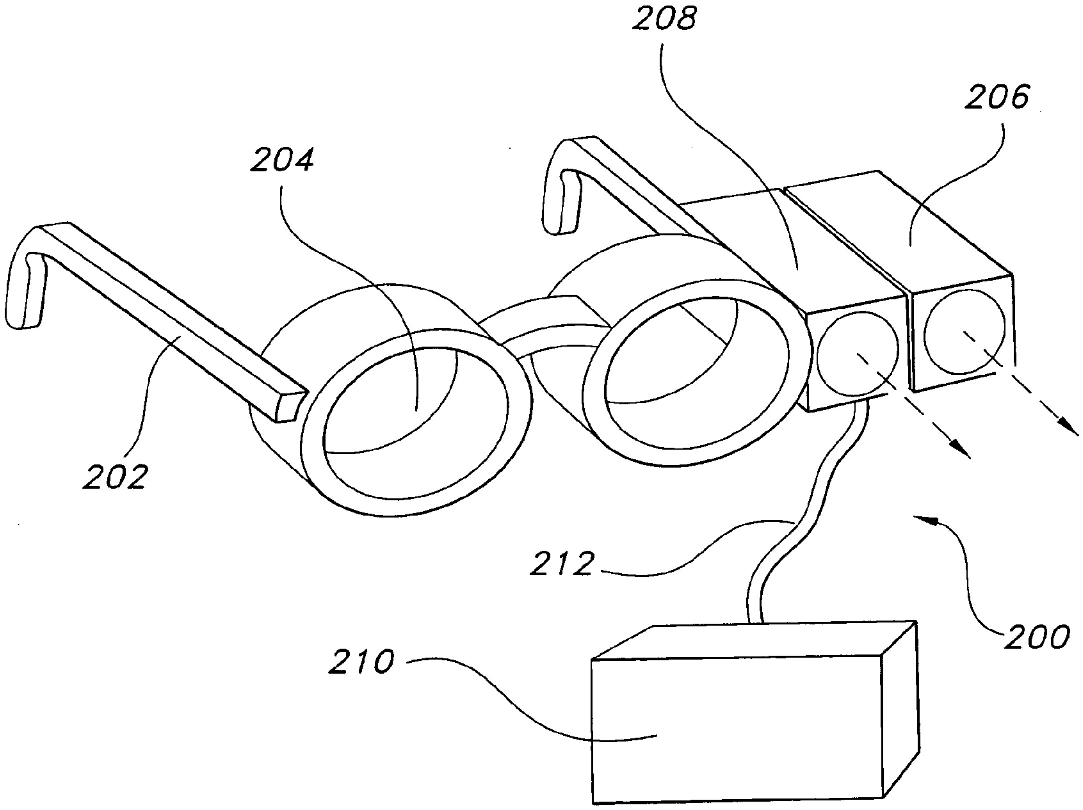
FIG. 2 is an embodiment of a data acquisition and display device.

FIG. 2 shows an embodiment of an exemplary data acquisition and display device 200. The embodiment of the data acquisition and display device 200 shown in FIG. 2 is comprised of five components, a set of frames or goggle 202, a see-through display 204, an information gathering device such as an image camera 206, a beacon detection device and orientation sensor 208, and a local computer 210 having a network interface (not shown). The see-through display 204 may be, for example, the MicroOptic SV-3 VIEWER™ as is available from The MicroOptical Corporation of Westwood, Mass., or similar devices as are available from Tek Gear, Inc. of Winnipeg, Manitoba, Kaiser, or Electro-Optics, Inc. of Carlsbad, Calif., among others. The see-through display 204 is used to display superimposed objects in the line-of-sight of real objects. The see-through display 204 should have a resolution sufficient to view the superimposed objects without causing excessive eye fatigue. In one embodiment, the resolution of the see-through display 204 may be, for example, a pixel format of 640 columns×480 rows and have a FOV of at least 75 degrees. The see-through display 204 may be either monochrome or color.

In other embodiments, the display may be a device separate from the goggle through which the items may be viewed or, in other embodiments, on which a representation of the item may be viewed wherein such representation may include outline images of the items, symbols that represents the items or characteristic information about the items.

In one embodiment, the beacon detection device 208 is a camera attached to the goggles 202 and is used to acquire active beacons 114 (for determining the position and orientation of a wearer), and to acquire passive beacons that are in the wearer's field of view. In one embodiment, the beacon detection device 208 is a beacon camera that is comprised of a wide-view (approximately 90° FOV) narrow band camera and orientation sensor. The beacon detection device 208 is used to acquire beacons (both active and passive) and the orientation sensor is used to track the orientation of the wearer.

In the embodiment shown in FIG. 2, the information gathering device is an image camera 206 that is mounted on the goggle 202. The image camera 206, in one embodiment, is a center-view visible light camera that is used to acquire label images. The center-view visible light camera (a/k/a the image camera) 206 is used to acquire images and facilitate the registration of these images with a passive beacon. In other embodiments, the image camera 206 may be separate from the goggle 202. Generally, the image camera 206 will have a depth of field that is fixed at about 12 inches to 30 inches and a FOV of about 28 degrees. The resolution of the image camera 206 in one embodiment is about 1500×1500 (2.25 million pixels). An image frame capture sequence for the image camera 206 is triggered by the discovery of a passive beacon in a close-proximity target zone. The image camera 206 may capture up to 1000 images per hour.

The goggles 202 should provide the wearer with a sufficient FOV such that the wearer does not have to continuously move their head back and forth. In one embodiment, this FOV is provided by goggles 202 having at least a 75 degree FOV, although other degrees of FOV may be used.

The local computer 210 is comprised of a computer and network interface (not shown) that determine the orientation and position determination of the wearer from images obtained from the beacon detection device and orientation sensors 208. The local computer 210 also performs view-plane computations, which is a process that uses the three-dimensional position data for each relevant object, and determines the position and orientation of the wearer of the data acquisition and display device 200. The local computer 210 manages the application-provided display symbology for each relevant object to determine what is to be displayed in the see-through display 204 and where to display the information such that it appears superimposed proximately about or on the item. The local computer 210 performs close-proximity passive beacon discovery and registration, information processing such as image capture from the image capture camera 206, calibration of the beacon detection device 208 and image camera 206 with the see-through display 204, calibration of active beacons 114 relative to fixed cameras 108, communications (generally, wireless), and machine-readable codes decoding, which is a capability that significantly reduces the response time for displaying information on already-registered objects. For example, the system 100 has ready to display information on an object and the object becomes obscured for a while and then re-appears; the user re-registers the object and quickly sees the relevant information; on-board decoding avoids the time to transfer the image across the communications network 120 to the business applications 124 for determination of display information. In one embodiment, for example, the local computer 210 may be a 250 MHz low power consumption CPU.

The local computer 210 packaging may also contain a power source (not shown), which may be self-contained such as, for example, batteries or other forms of rechargeable, replaceable, reusable or renewable power sources. In one embodiment, for example, the power source is 10-volt, 3 amp-hour battery.

Figure 3:
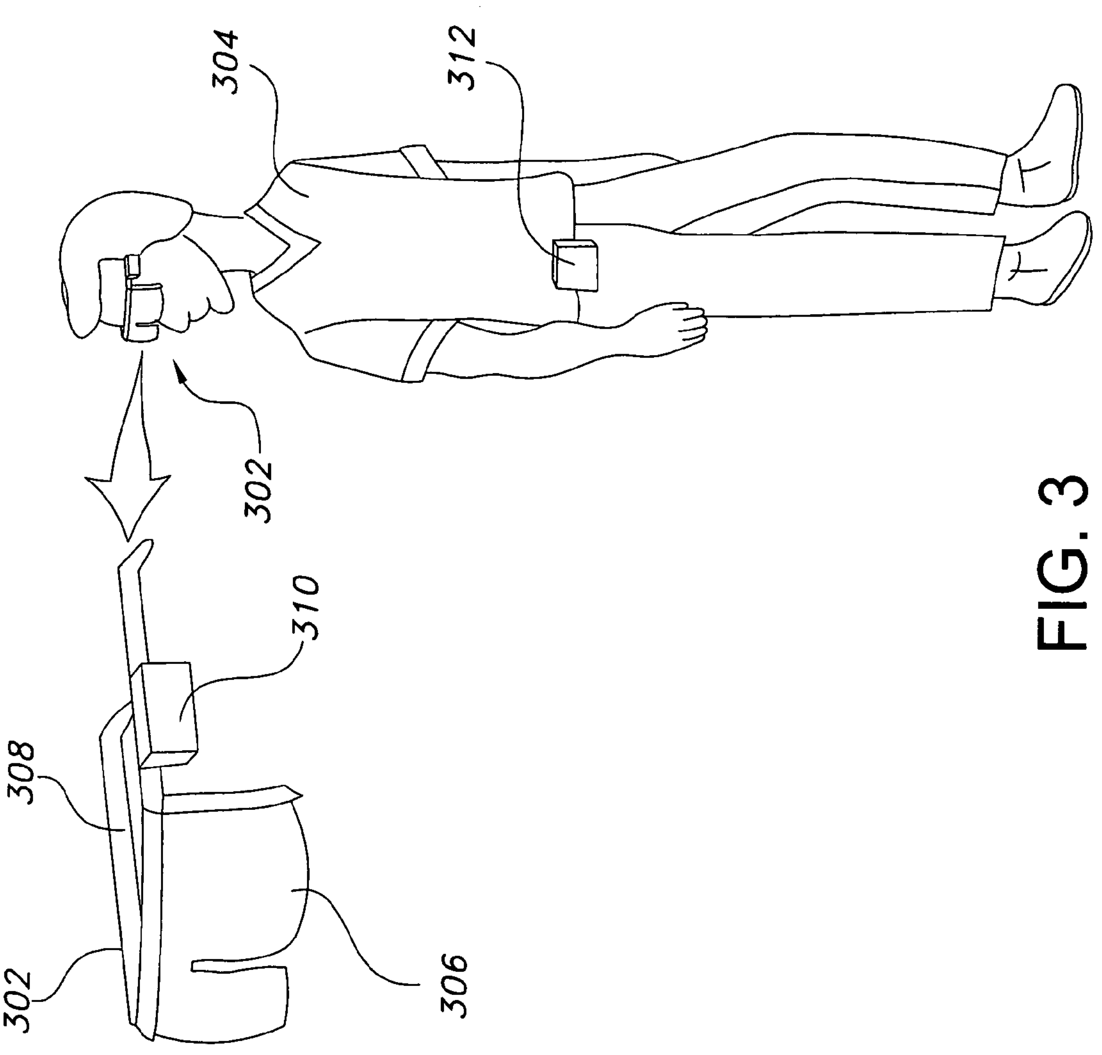
FIG. 3 is an embodiment of an exemplary data acquisition and display device as shown on a wearer.

In the embodiment of FIG. 3, the local computer 210 communicates with the goggle-mounted devices 204, 206, 208 via a cable 212. In other embodiments, however, such communication may occur wirelessly, through fiber optics, or combinations thereof. FIG. 3 is an embodiment of the data acquisition and display device 302 as shown on a wearer 304. As shown in the embodiment of FIG. 3, the data acquisition and display device 302 is comprised of a see-through display 306 that is attached to or incorporated into a set of frames or goggles 308, and one or more information gathering devices such as cameras, and orientation sensors 310 attached to the frames 308.

The frames 308 are head-mounted on a wearer 304, similar to a pair of glasses or goggles. A local computer 312 communicates with the see-through display 306, information gathering devices, and orientation sensors 310, optical tracking system 104, and business applications 124 over one or more networks.

Tracking Systems

Figure 4:
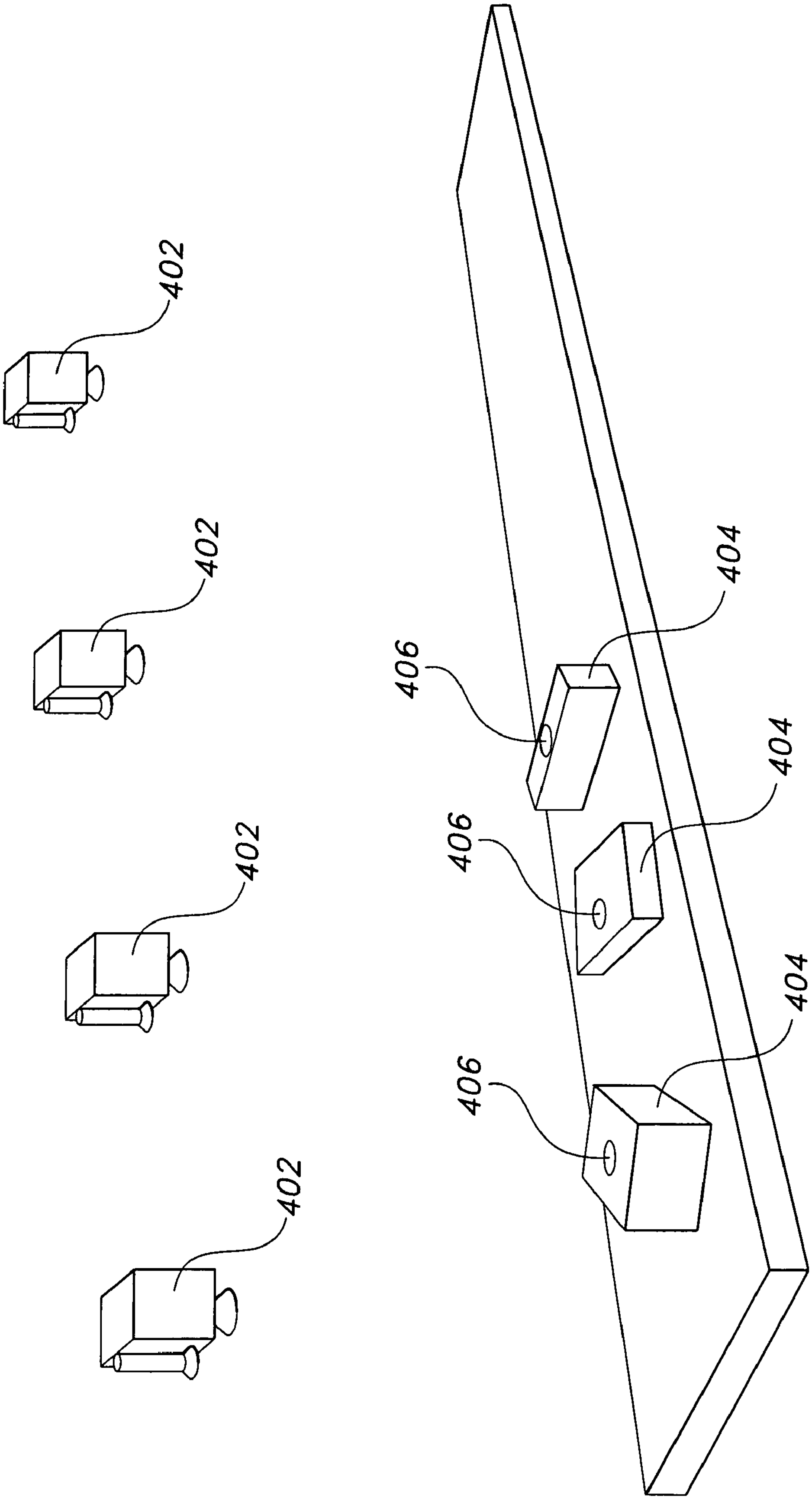
FIG. 4 is an exemplary diagram of the use of fixed detectors such as, for example, fixed cameras for a passive beacon location tracking application in an embodiment of the invention.

FIG. 4 is an exemplary diagram of the use of fixed detectors fixed cameras in a passive beacon location tracking application in an embodiment of the invention. The fixed detectors such as, for example, fixed cameras 402 are mounted at fixed positions in the vicinity of the objects of interest 404. The purpose of these fixed cameras 402 is to continuously provide images to the process that computes the current location of each object of interest (a/k/a "items") 404. The objects of interest 404 may be singulated (as shown), or non-singulated. Each object of interest 404 is associated with at least one passive beacon 406.

Figure 5A:
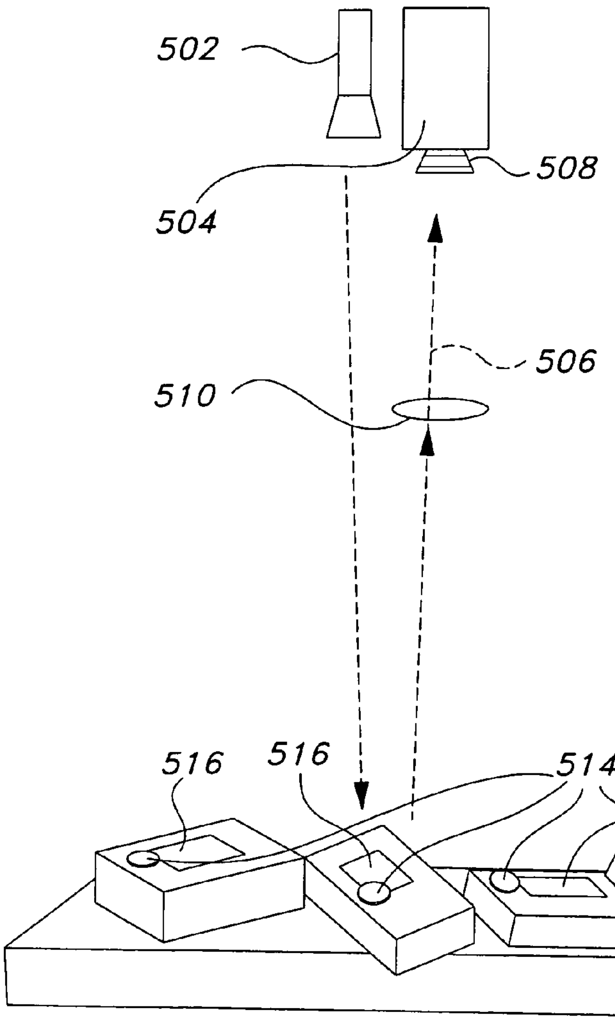
FIG. 5A is an exemplary diagram of the use of fixed detectors such as, for example, fixed cameras in a passive beacon location tracking application in an embodiment of the invention, and having more detail than the embodiment shown in FIG. 4.
Figure 5B:
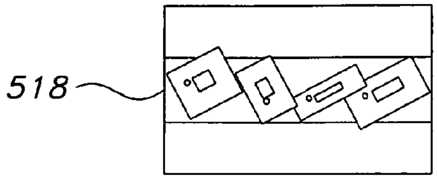
FIG. 5B is an exemplary view of an image captured by a fixed camera in a passive beacon location tracking application, without a filter, in an embodiment of the invention.
Figure 5C:
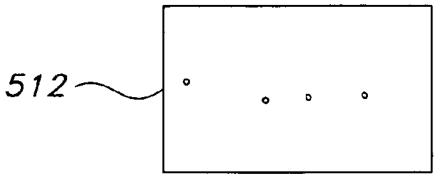
FIG. 5C is an exemplary view of an image captured by a fixed camera in a passive beacon location tracking application, with a filter, in an embodiment of the invention.

FIG. 5C is an exemplary diagram of the use of fixed detectors such as, for example, fixed cameras 504 in a passive beacon location tracking application in an embodiment of the invention and having more detail than FIG. 4. In this embodiment, an energy source such as, for example, a light source 502 is attached to each fixed camera 504 and aimed along the image path 506. The light source 502 is generally not visible to the human eye (e.g., infrared), although in other embodiments other visible or non-visible light sources may be used such as, for example, lasers, colors or colored lights, ultraviolet light, etc. The lens 508 of the camera 504, in one embodiment as shown in FIG. 5C, is covered with a filter 510 that is matched to the frequency of the light source 502. The purpose of the light source 502 and filter 510 is to provide an image 512 that only shows passive beacons 514 that are attached to or associated with each singulated or non-singulated item of interest 516, as shown by the images 512, 518 of FIGS. 5C and 5B, respectively. In one embodiment, the fixed cameras 504 are low-cost, web-cam type cameras having a resolution of about 640×480 pixels.

Figure 6:
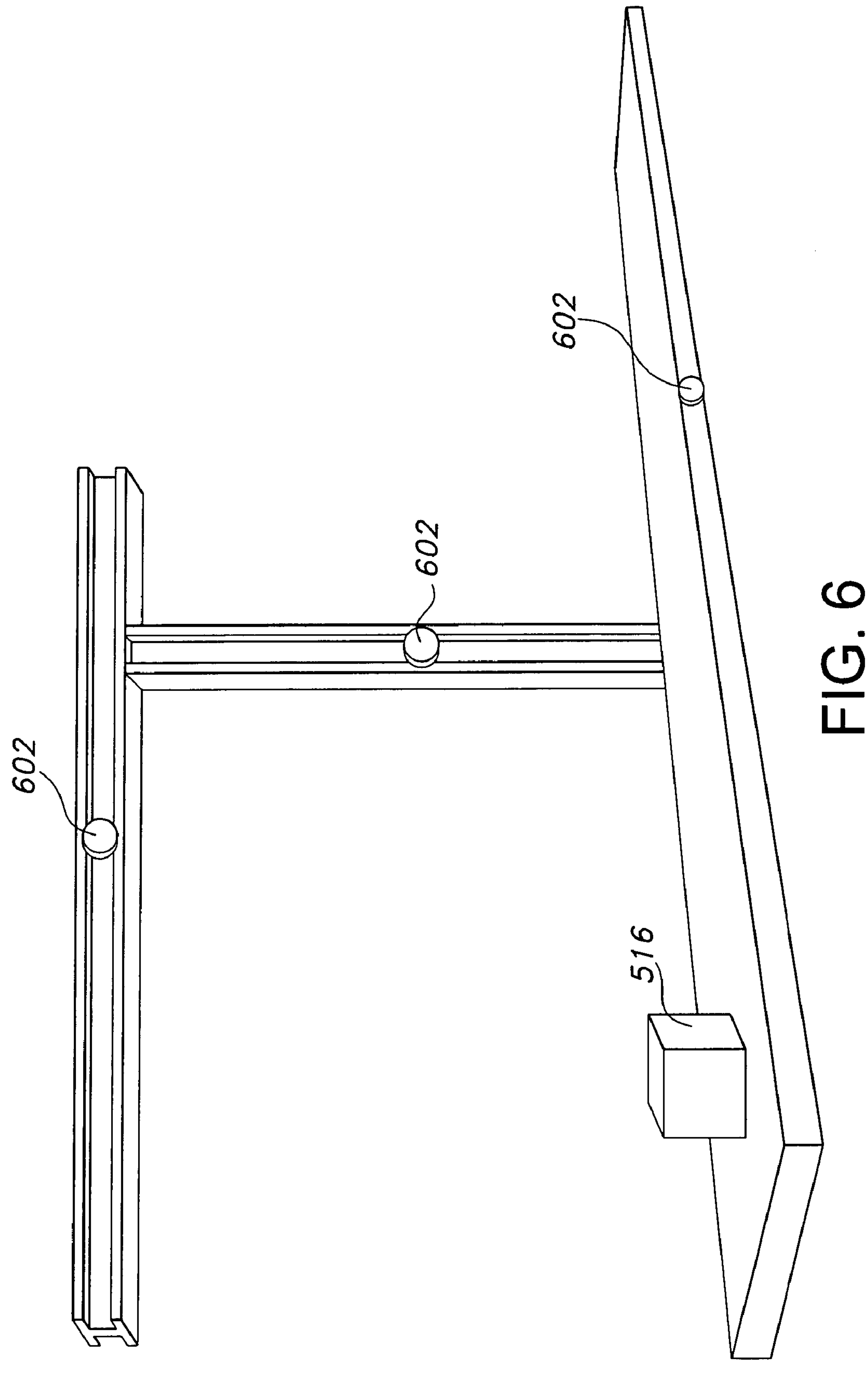
FIG. 6 is an exemplary illustration of the use of active beacons for determining the position and orientation of a wearer of a data acquisition and display device in an embodiment of the invention.

FIG. 6 is an exemplary illustration of the use of active beacons 602 for determining the position and orientation of a wearer 304 of a data acquisition and display device 102 in an embodiment of the invention. The active beacons 602 provide a reckoning reference for the local computer 112 to determine the position and orientation of a user wearing the device 102. In one embodiment, the active beacons 602 are sources of blinking light that are each uniquely recognized by the beacon detection device 116 of the data acquisition and display device 102. In other embodiments, the active beacon 602 may be any source of unique magnetic, electrical, electronic, acoustical, optical transmission that are recognizable by the beacon detection device 116 of the data acquisition and display device 102. Each active beacon 602 has a relative fixed position 604 such as, for example, three-dimensional coordinates x, y, and z. The relative fixed position 604 of each active beacon 602 is known to the local computer 112, therefore the relative position and orientation of a wearer of the data acquisition and display device 102 may be computed by the local computer 112 by determining which active beacons 602 are in the FOV of the beacon detection device 116 of the data acquisition and display device 102.

Generally, the energy source of the active beacon 602 is infrared light, although other visible or non-visible sources may be used such as lasers, colors or colored lights, ultraviolet light, etc. Furthermore, in some instance, each active beacon 602 may use unique non-optical signals such as, for example, electronic transmissions, acoustical, magnetic, or other means of providing a unique signal for determining the orientation and position of the wearer 304.

In an embodiment where the active beacon 602 is a source of blinking infrared light and the beacon detection device 116 is a beacon camera, each active beacon 602 is uniquely identified by a blinking pattern that differentiates each active beacon 602 from other light sources and from other active beacons. For example, in one embodiment each active beacon 602 transmits a repeating 11-bit unique identification pattern. This pattern consists of a 3-bit preamble followed by an 8-bit ID value. For instance, the preamble may be "001" and the ID value may be one of 88 values that do not begin with or contain the string "001." Each pattern bit is split into two transmit bits. The state of the transmit bit determines whether the beacon is on or off. The value of the transmit bits are determined using a standard technique called "alternate mark inversion" or AMI. AMI is used to ensure that the beacon has a reliable blink rate. AMI is generally encoded whereby a "0" information bit becomes "01" and a "1" information bit alternates between "11" and "00." The duration of the transmit bit is a little longer than the frame capture interval of the beacon camera 116. This is so that the beacon camera 116 does not miss any blink states. Assuming, for example, a 10 frames per second frame rate, the transmit bit will last for about 110 milliseconds. Therefore, the time for the active beacon to cycle through the entire identification cycle is: 11 bits×2 transmit bits×110 milliseconds=2.4 seconds. The on/off cycle of each active beacon 602 is about 220 milliseconds or 440 milliseconds. The beacon detection device 116 of this embodiment is able to isolate beacon 602 blinkers from background noise by filtering out all light sources that do not have the given frequency.

Figure 7:
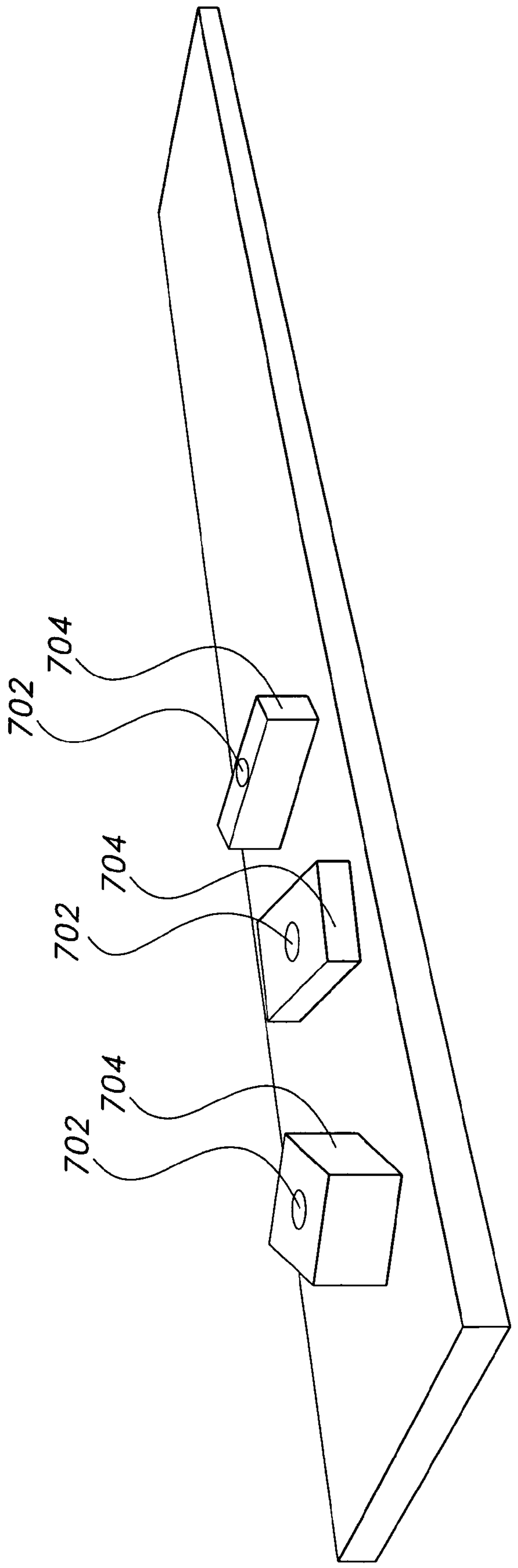
FIG. 7 is an exemplary illustration of the use of passive beacons in an embodiment of the invention, as such passive beacons are used for the tracking of items.

FIG. 7 is an exemplary illustration of the use of passive beacons 702 in an embodiment of the invention, as such passive beacons 702 are used for the tracking of items 704. The passive beacon 702 is intended to be a low-cost item that is attached to or associated with each item of interest 704. Its purpose is to provide a registration trigger for each item 704 and to provide a reference point to aid in three-dimensional position tracking from image data, as obtained from the fixed cameras 504. In one embodiment, the passive beacon 702 is a use-once, adhesive light reflector, such as retro-reflective dots available from 3M of St. Paul, Minn. Retro-reflection causes light from a certain location to be reflected back, without extensive scattering, to the source of the light. The light source 502 attached to each fixed camera 504 (previously described—see FIG. 5A) is reflected back to the fixed camera 504. Because most other extraneous sources of light (noise) will be from sources less-reflective than the retro-reflective dots, the image viewed by the fixed camera 504 will be easily processed to eliminate most shapes except for the passive beacons 702. Generally, a passive beacon 702 having a diameter of approximately one-half inch will provide the resolution necessary for the fixed cameras 504 at a reasonable range.

In other embodiments, the passive beacon may be an RFID tag located on or associated with the item. A modulated RFID signal is returned from the RFID tag passive beacon when a certain RF signal is present. Further, such a passive beacon overcomes challenges associated with passive beacons that must maintain a certain orientation toward a detector. For instance, an RFID passive beacon could continue to be tracked if the item is flipped over or if it passes under some obstructions. As previously described, U.S. Pat. No. 6,661,335, incorporated fully herein, describes a system and method for tracking a RFID transponder relative to a sensor (e.g., fixed detector).

The process involved in the optical tracking system knowing the position of the passive beacons 702 is two-part; passive beacon registration and passive beacon tracking.

Figure 8B:
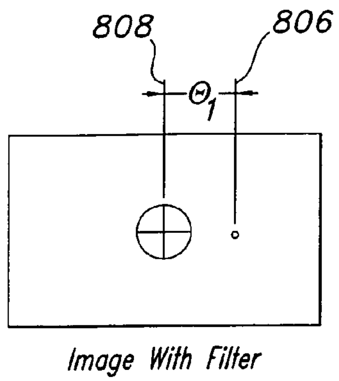
FIGS. 8A, 8B and 8C are exemplary illustrations of the concept of passive beacon tracking in an embodiment of the invention.
Figure 8C:
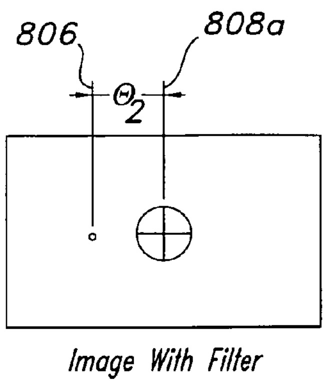
Figure 8A:
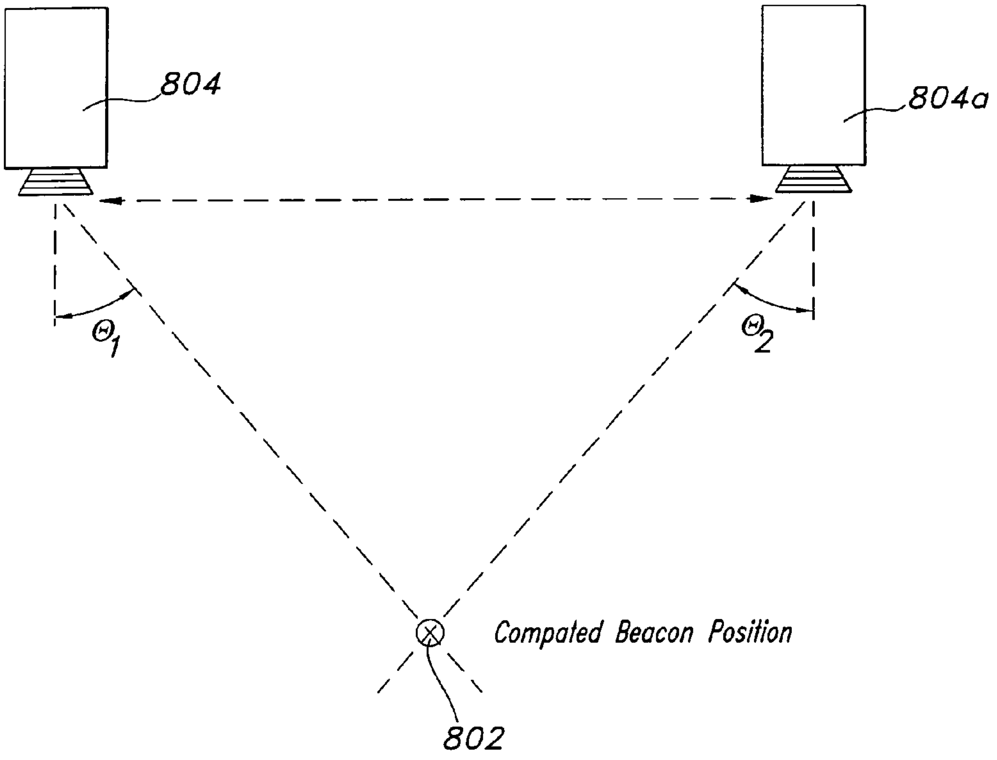

The concept of passive beacon tracking is illustrated in the embodiment shown in FIGS. 8A, 8B and 8C. Passive beacon tracking occurs once a passive beacon 806 has been detected by two or more fixed detectors such as, for example, fixed cameras 804, 804*a*. The three-dimensional computed position 802 of the passive beacon 806 is determined from knowing the position and orientation of each fixed camera 804, 804*a*. The passive beacon location tracking system 110 computes the passive beacon's position from two-dimensional images (FIGS. 8B and 8C) from the fixed cameras 804, 804*a* that are interpolated to be synchronized in time that track the position of passive beacon 806 relative to the location 808, 808*a* of each of the fixed cameras 804, 804*a*.

The passive beacon location tracking system 110 should keep track of a passive beacon 802 during periods of intermittent disappearance and when the passive beacons 802 are visible to only one fixed camera 804 to provide consistent tracking. Two fixed cameras 804 first acquire a passive beacon 802 to initially determine the passive beacon's location, but a "lock" is maintained while the passive beacon 802 is visible to only one fixed camera 804. The passive beacon location tracking system 110 makes assumptions about the passive beacon's motion that enable the lock to be maintained during times of disappearance. For example, streams of passive beacons associated with items flowing along on a conveyor system (as shown in FIGS. 5A and 5C) have a high likelihood of not flowing backward. The probable trajectory of the passive beacon 802 is used by an algorithm of the passive beacon location tracking system 110 to track the unobserved passive beacon 802. It may also be possible to track passive beacons 802 flowing under a conveyor over-pass by observing continuous flow. However, when a passive beacon 802 falls out of view of all fixed cameras 804 for a significant period of time, the passive beacon location tracking system 110 loses the item and it (the passive beacon 802) is essentially gone from the perspective of the passive beacon location tracking system 110.

Figure 9:
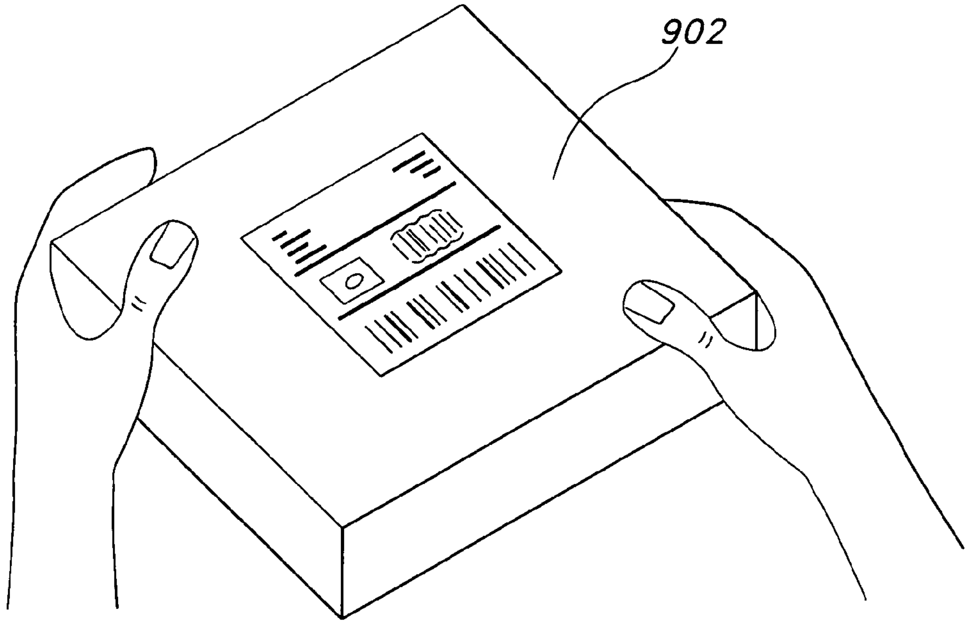
FIG. 9 is an exemplary illustration of a person obtaining an item and placing a retro-reflective dot (i.e., a passive beacon) on the item, however, in FIG. 9, the passive beacon is not visible as it is underneath the person's thumb.
Figure 10:
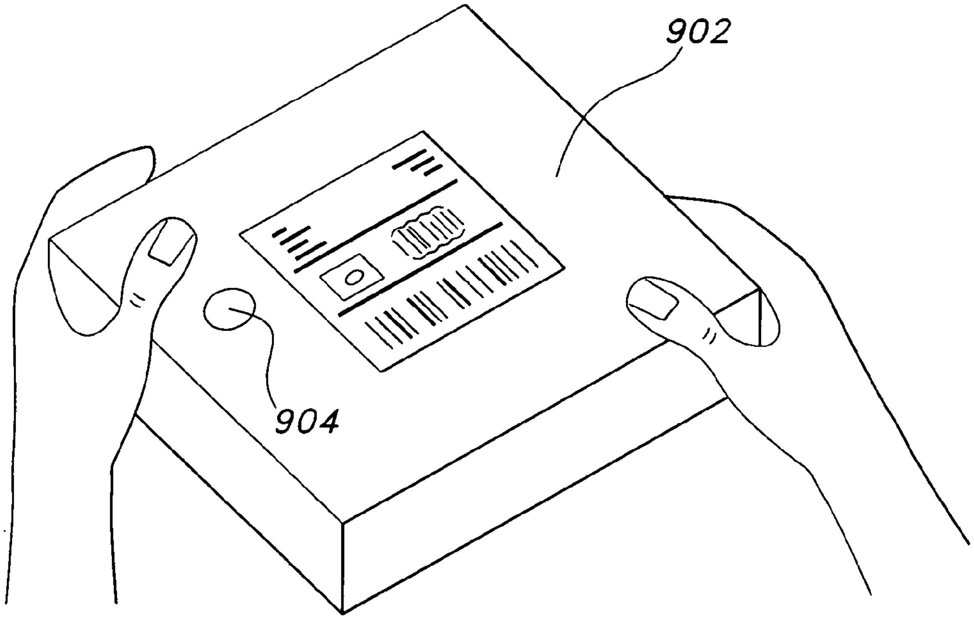
FIG. 10 is an exemplary illustration of a person covering and exposing a passive beacon with their thumb and causing a "wink"

FIGS. 9 and 10 provide exemplary illustrations of the concept of passive beacon registration, in an embodiment of the invention. Passive beacon registration occurs when a passive beacon is being detected simultaneously by two or more fixed detectors and the passive beacon location tracking system 110 declares that the passive beacon is discovered. In an embodiment having a passive beacon comprised of reflective material and fixed detectors comprised of fixed cameras, the passive beacon location tracking system discovers a passive beacon when a prominent reflection (generally, an infrared reflection) "winks" at the beacon detection device 116 (in this instance, a beacon camera). In FIG. 9, a person wearing a data acquisition and display device 102 has obtained an item 902 and has placed a retro-reflective dot (i.e., a passive beacon) 904 on the item 902. In the embodiment of FIG. 9, the passive beacon 904 is not visible as it is underneath the person's thumb. In FIG. 10, the person has moved their thumb, thereby exposing the passive beacon 904, and causing a "wink." The "wink" is a sudden long-duration (greater than approximately one-half second) steady reflection from the passive beacon 904. The "wink" is also observed by the fixed cameras 108 of the optical tracking system 110. The local computer 112 of the data acquisition and display device 102 assigns the newly-acquired passive beacon 904 a unique handle. The data acquisition and display device 102 notifies the passive beacon location tracking system 110 of the passive beacon 904 discovery and its handle, as well as the approximate location of the discovered passive beacon 904.

The passive beacon location tracking system 110 relates the discovered passive beacon's handle to the tracked passive beacon that was observed to "wink" at the fixed cameras 108. The optical tracking system 104 acknowledges the lock-on of the passive beacon 904 to the data acquisition and display device 102, allowing the data acquisition and display device 102 to provide positive feedback of tracking to the wearer. The optical tracking system 110 publishes, and continually updates, the three-dimensional position of the passive beacon 904 relative to the passive beacon's 904 given unique handle. In other embodiments, the "winking" process may be performed by mechanical shutters between the passive beacon and the fixed cameras 108 and/or image device 206, by adjusting the apertures of the cameras 108, 206, or by "self-winking" or blinking passive beacons 904.

Figure 11:
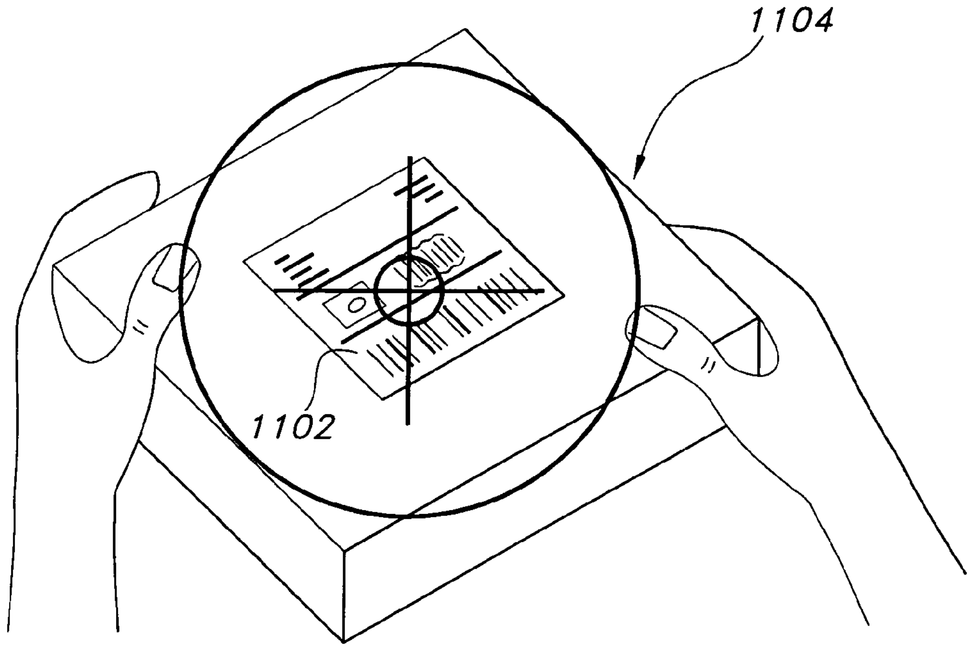
FIGS. 11 and 12 are exemplary illustrations of the concept of acquiring item information (e.g., label information) in an embodiment of the invention.
Figure 12:
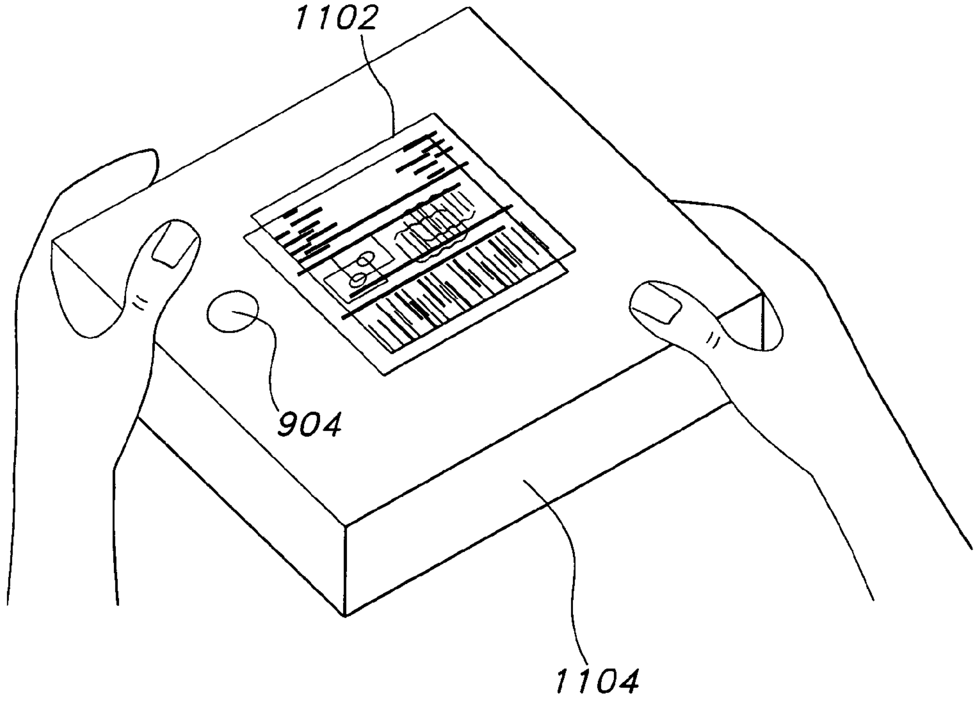

FIGS. 11 and 12 illustrate the concept of acquiring item information (e.g., label information) in an embodiment of the invention. In this embodiment, the information gathering device is an image camera 206. The image camera 206 of this embodiment of the data acquisition and display system 200 acquires the image 1102 from the item 1104. The local computer 210 of the data acquisition and display device 200 receives the image 1102 from the image camera 206 and decodes machine-readable codes (e.g., barcodes, etc.) from the image and passes the image 1102 and decoded information for the related passive beacon handle to any associated business applications 124. These business applications 124 assign relevant displayable information that will be presented to designated wearers of a data acquisition and display device 200 when the passive beacon's 904 three-dimensional position is within the see-through display's 204 field of view and within range. In another embodiment (not shown) the "label" is an RFID tag and the information gathering device 126 is an RFID reader. In yet other embodiments (not shown), the item information may be acquired by fixed devices or devices separate from the data acquisition and display device, as such devices are known in the art. In the particular embodiment of FIG. 11, an image of the acquired information 1102 is displayed on or proximate to the item 1104 to verify acquisition of the information.

Orientation of the Data Acquisition and Display Device

The local computer 112 uses real-time information derived from the beacon detection device 116 to determine orientation and position of the data acquisition and display device 102, and thus any wearer of the device 102, relative to the active beacons 114. The orientation information derived from the beacon detection device 116 is augmented by highly responsive inertial three degrees-of-freedom (DOF) rotational sensors (not shown separately from 116).

The orientation information is comprised of active beacon IDs and active beacon two-dimensional image position from the beacon detection device 116. Additional information that is needed includes the active beacons' three-dimensional reference locations versus the active beacons' IDs. Multiple active beacons 114 are used to determine the data acquisition and display device's 102 orientation and position. The more active beacons 114 used to compute orientation and position, the greater the accuracy of the measurement. Also, it may be possible that a particular active beacon ID value is used for more than one active beacon in a particular facility. Therefore, the data acquisition and display device 102 must be able to discard position values that are non-determinant (i.e., non-solvable positions from beacon images).

Because of the relatively slow nature of the active beacon ID transmission sequence, the tracking design must accurately assume the identification of each active beacon 114 for each updated image capture frame. Once an active beacon 114 is identified, the data acquisition and display device 102 must "lock-on" and track its motion (as caused by movement of the wearer) in the two-dimensional image plane. The known unique blink or transmission rate, pattern or signal of the active beacons 114 allows the image processor to remove most energy sources from the image that are not active beacons 114 by use of a filter such as, for example, a narrow-pass filter. The remaining active beacons are identified after observing a complete ID cycle (previously described). The extrapolated two-dimensional position of each identified active beacon 114 is input into the three-dimensional position and orientation computation process.

Inertial Navigation

Because it may be difficult to track a wearer's head movement with active beacons 114 when the wearer's head moves relatively quickly, inertial sensors, in combination with the beacon detection device 116, may be used in these instances to determine head orientation. Inertial navigation technology, in one embodiment, uses semiconductor-sized micro-machined accelerometers to detect rotation. Such devices are commercially available from manufacturers such as, for example, InterSense, Inc. of Burlington, Mass., among others. The inertial navigation sensors may replace or supplement the active beacon 114 orientation signal during times of rapid head movement.

Calibration (Positioning) of Fixed Detectors

Figure 13:
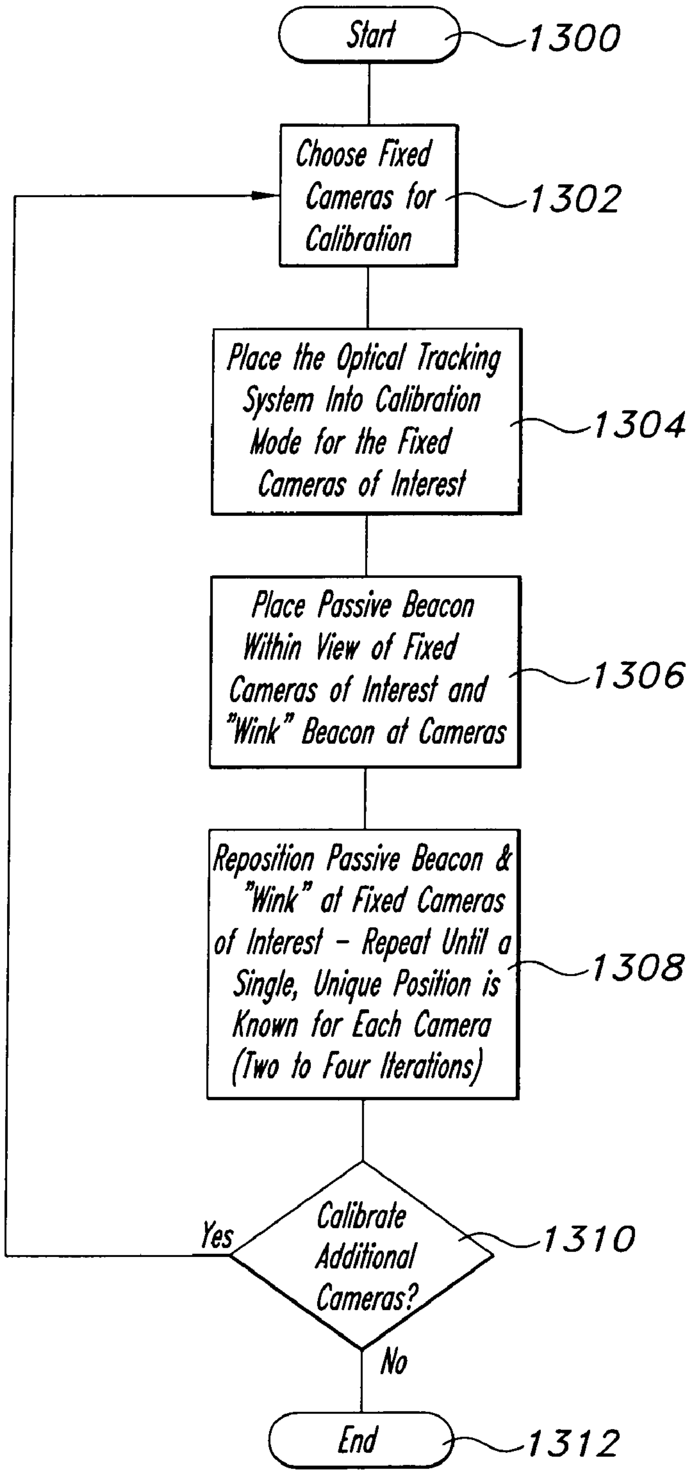
FIG. 13 is a flowchart describing the steps involved in calibrating a fixed camera by establishing the fixed camera's position and orientation.

The process of installing fixed detectors such as, for example, fixed cameras 108 and establishing their known position in relation to other fixed cameras 108 is a multi-step process whereby multiple fixed cameras 108 observe the same object and learn their position and orientation relative to one another. Referring to the flowchart FIG. 13, the following steps are involved in establishing a fixed detector's position and orientation: the process begins with Step 1300. In Step 1302, the first and second fixed detectors to be calibrated are chosen because they are installed adjacent (with a normal separation distance for tracking) to each other. In Step 1304, the tracking system 104 is placed into calibration mode for the two fixed detectors of interest. In Step 1306, a passive beacon 904 is placed within view of both fixed detectors and the passive beacon is covered or blocked and uncovered several times so as to cause a "winking" effect, thus causing the tracking system 104 to calculate the possible positions and orientations of both fixed detectors relative to one another. In Step 1308, the passive beacon 904 is repositioned to a different location within view of both fixed detectors and the "winking" procedure of Step 1306 is repeated. In Step 1308, the passive beacon repositioning/winking process is repeated until the tracking system 104 indicates that a single unique position is known for each fixed detector, which may take between two and four iterations of the repositioning/winking process. In Step 1310, the third through the remaining fixed detectors are calibrated in a similar repositioning/winking process until all fixed detectors are calibrated. If a fixed detector will not calibrate during the repositioning/winking process, it may be installed incorrectly and need to be re-installed or repaired. The process ends at Step 1312. When a new fixed detector is installed or an old fixed detector is moved, the repositioning/winking process is performed so that the detector's new position is learned relative to the calibrated adjacent detectors.

Calibration of Data Acquisition and Display Device

The data acquisition and display device 200 is calibrated so that the alignment between the devices of the data acquisition and display device 200 is known. It is assumed that normal manufacturing tolerances and routine use will result in some amount of mis-alignment of the active beacon detection device 208, information gathering device such as an image camera 206, and the see-through display 204. These devices require concurrent alignment for better operational characteristics of the data acquisition and display device 200. The procedure requires first placing the data acquisition and display device 200 into calibration mode by aiming the image camera 206 at a special pattern or barcode. A crosshair pattern is then displayed on the see-through display 204 and the crosshairs are aimed at the special calibration pattern. The see-through display 204 will then ask for successive trials of aiming the crosshairs of the see-through display 204 until the data acquisition and display device 200 is able to isolate the needed precision in the alignment compensation for the imaging camera 206, beacon detection device 208, and the see-through display 204. This calibration information will be retained by the data acquisition and display device 200 until the next calibration mode process.

Calibration Of Active Beacons

The position of each active beacon 114, relative to the fixed detectors such as, for example, fixed cameras 108, must be known so that the data acquisition and display device 102 can determine the position and orientation of a wearer relative to the active beacons 114. The calibration process begins by attaching an active beacon 114 to the side of each of three calibrated and adjacent fixed cameras 108 or by having three active beacons 114 with known locations. The positions of these active beacons are now known from the positions of the fixed cameras 108. A fourth active beacon 114 is placed anywhere within the field of view of the beacon detection device 116 along with the three initially placed active beacons 114 having known locations. With a calibrated data acquisition and display device 102 that has been placed in its active beacon calibration mode, the wearer aims the crosshairs displayed in the see-through display 118 at the fourth active beacon 114. The wearer is then prompted to reposition the data acquisition and display device 102 (while still maintaining the three active beacons 114 with known locations and the fourth active beacon 114 in the field of view of the beacon detection device 116) several times until a location for the fourth active beacon 114 is computed by the local computer 112. This process is repeated as active beacons 114 are added throughout the facility. Anytime a new or moved active beacon 114 is installed, this aiming and calibration process with a data acquisition and display device 102 will determine the relative location of the active beacon 114.

The installer of the active beacon 114 chooses the physical ID values for each active beacon 114. The installer should not use equivalent IDs on active beacons 114 that are adjacent to a common active beacon 114. One way to prevent this is to section the facility off into repeating 3×3 grid zones, zones "a" through "i." All active beacons 114 installed in an "a" zone are assigned an ID from a pre-determined "a" set of IDs, all active beacons installed in an "b" zone are assigned an ID from a pre-determined "b" set of IDs, etc. The size of each zone is a function of the number of active beacons 114 that may be maximally required in each zone. The 3×3 grid is repeated throughout the facility as often as needed. The random nature of active beacon locations generally prevents any two zones within the facility from having the exact relative positioning of active beacons 114 within each zone. Each active beacon 114 in an installation has a unique logical ID value (previously described) that is assigned to the combination of a physical ID value and a three-dimensional position. The active beacon installation process produces and assigns the logical ID value.

Component Interfaces

Figure 14:
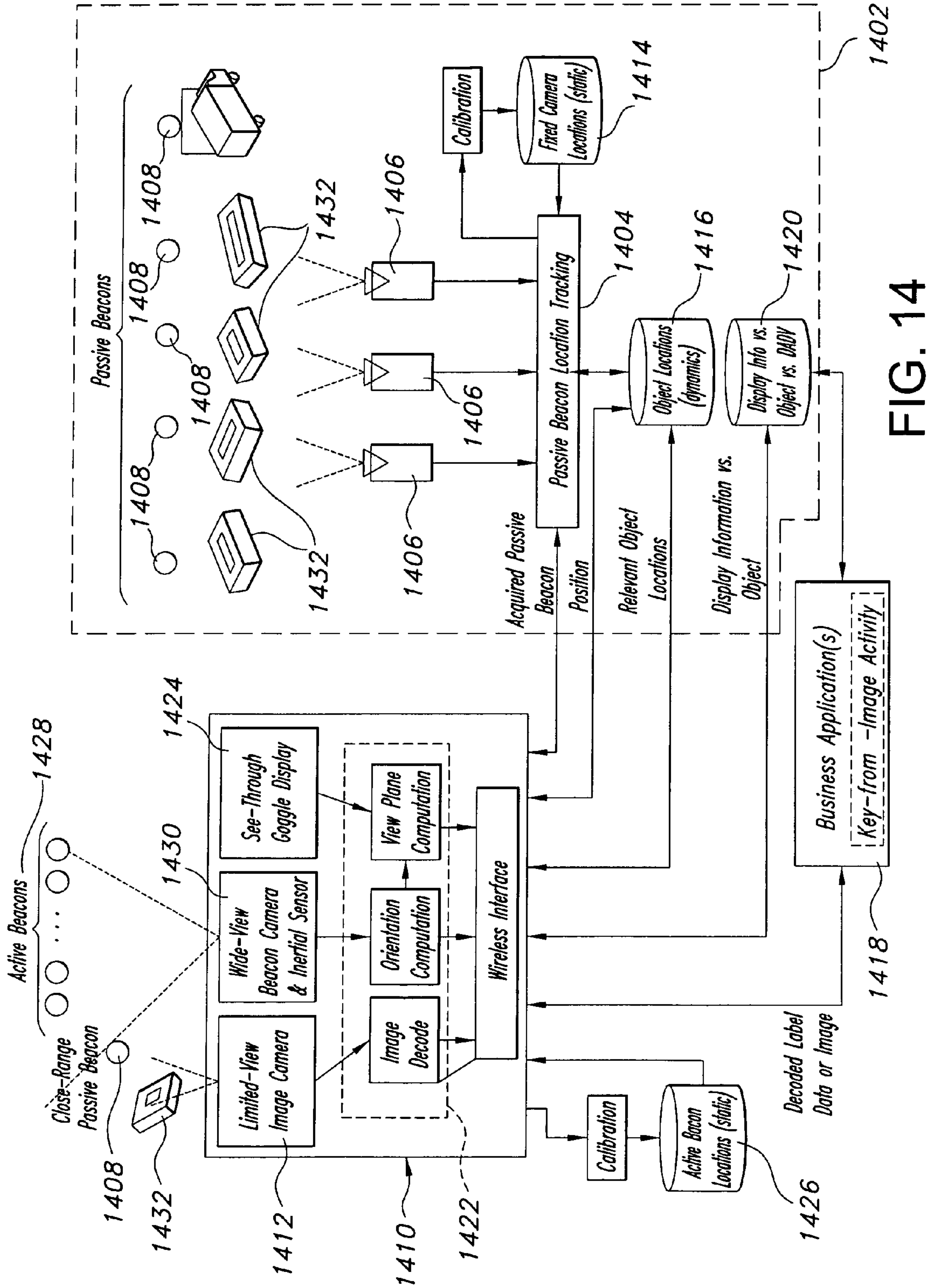
FIG. 14 is an embodiment of an item tracking system of the invention and is an exemplary illustration of the interfaces of such an embodiment.

Referring to FIG. 14, the optical tracking system 1402 of this embodiment is designed to be as self-contained as possible. A passive beacon location tracking ("PBLT") computer 1404 accepts all fixed camera 1406 images and, with the known relative position and orientation of the fixed cameras 1406, uses the images to determine the three-dimensional location of each tracked passive beacon 1408. The optical tracking system 1402 is comprised of one or more inputs from an information gathering device 1412 of one or more data acquisition and display devices 1410 that cue the registration of a passive beacon 1408 for tracking; the fixed cameras 1406 from which the PBLT 1404 reads all images from each fixed camera 1406; a fixed camera locations repository 1414 that contains each fixed camera's logical ID, position and orientation and is used to calculate the positions of all tracked passive beacons 1408, and is updated when the PBLT 1404 is in fixed camera installation mode; object location repository 1416, which stores the location of each passive beacon (or item) 1408 by the item's logical ID (may be accessed by business applications); and, a maintenance console (not shown in FIG. 14), which is a user interface that provides information about the optical tracking system's 1402 configuration and controls the installation mode for the fixed cameras 1406. The passive beacons 1408 are generally associated with items (e.g., parcels) 1432, so that the items may be tracked.

Application Interfaces

Still referring to FIG. 14, in addition to providing information to wearers of a data acquisition and display device 1410, the optical tracking system 1402 is capable of providing information to other business applications 1418. For example, in one embodiment, the business application receives an item's logical ID and decoded label information of the item from the data acquisition and display device 1410. The business application 1418 converts the label information into display information and publishes the information to a data repository 1420 that contains object ID information and associated display information. By cross-referencing the object ID information with the object location repository 1416 of the optical tracking system 1402, this information can be provided to a data acquisition and display device 1410 that, by knowing its position and orientation as determined by an orientation computation process of the local computer 1422, the display information can be displayed on the see-through display 1424 such that it is properly associated with the object. The orientation computation process involves accessing an active beacons location database 1426 containing the know locations of active beacons 1428 and a unique identifier assigned to each active beacon 1428 such that when a wearer of a data acquisition and display device 1410 detects certain active beacons 1428 by their assigned identifier with the data acquisition and display device's beacon detection device 1430, the local computer is able to compute the orientation and position of the data acquisition and display device 1410.

In another embodiment, the business application 1418 receives images of objects and converts the images into display information. In other embodiments, the business application 1418 receives a logical ID value for the data acquisition and display device 1410 that provided the information, along with decoded label data. If the decoded label data is of the type that is application-defined to represent a job indicator, then the business application 1418 is able to discern which data acquisition and display device 1410 is assigned to each job type and display information is provided to only this data acquisition and display devices 1410. Finally, the business application 1418 receives an item's logical ID along with the item's position from the optical tracking system 1402. The business application 1418 uses the position information to determine the status of certain items, project processing times, measure throughput of items in a facility, and make other business decisions.

System Operation Example

Figure 15:
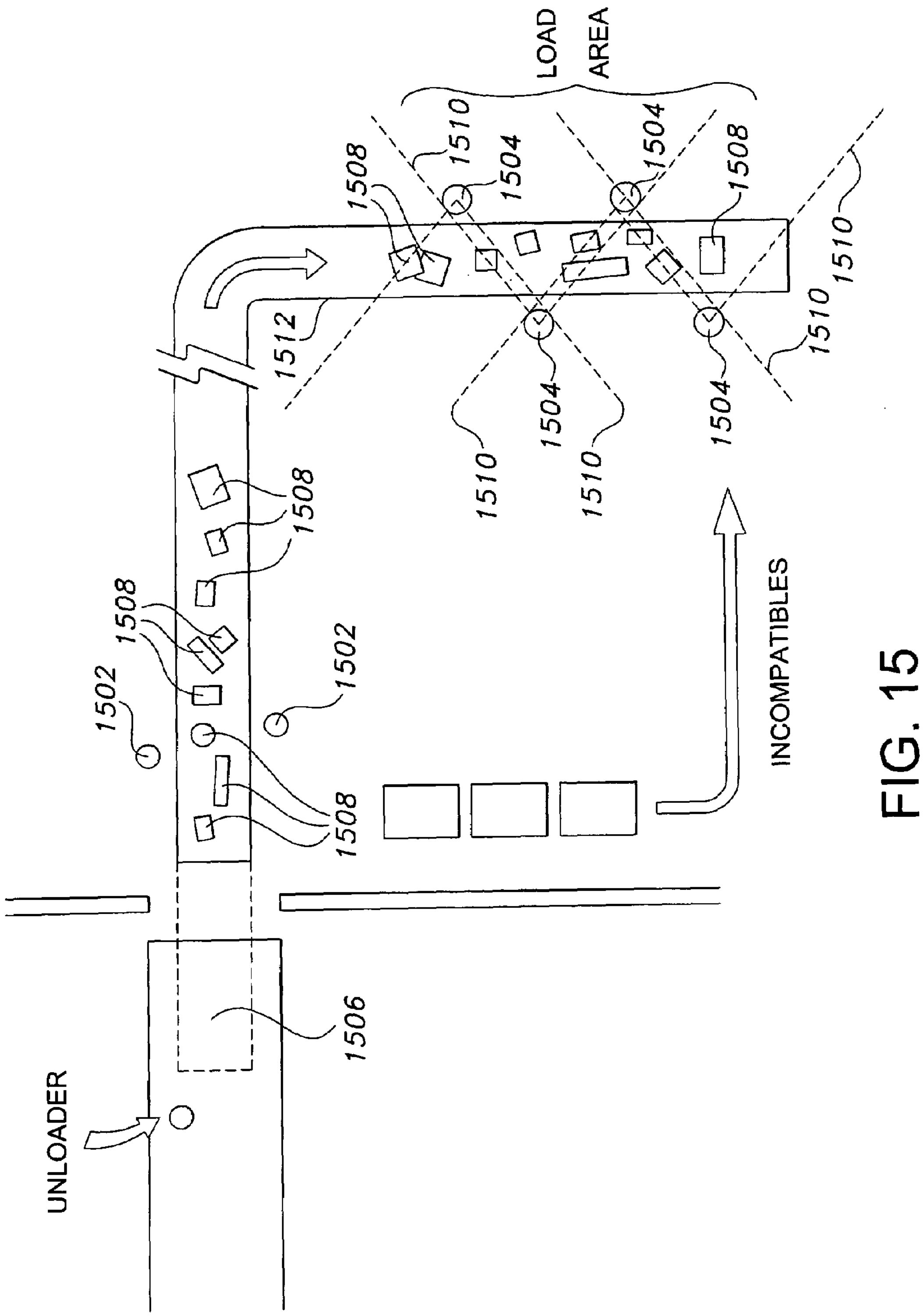
FIG. 15 shows an exemplary application of an embodiment of the system of the invention in a parcel sorting facility.

An exemplary method of applying an embodiment of the system of the present invention is its use in a parcel sorting facility as shown in FIG. 15. In this example, a data acquirer ("Acquirer") 1502 and a parcel sorter ("Sorter") 1504 wear and use a data acquisition and display device 200 in the performance of their duties. However, in other embodiments, the step of acquiring item information may be performed by devices not connected to a data acquisition and display device 200 such as by an over-the-belt scanning system, as are known in the art. Others, such as supervisors and exception handlers may also wear a data acquisition and display device 200, but those persons are not described in this particular example.

In a first step, the Acquirer 1502 and Sorter 1504 each don a data acquisition and display device 200, power it up, and aim the information gathering device such as, for example, an image camera 206 at a special job set-up indicia, pattern, or barcode that is application defined. The chosen business application, as selected by the job set-up indicia, is notified by each data acquisition and display device 200 of the initialization and job set-up. The business application thus becomes aware of the data acquisition and display devices 200 that are participating in each job area.

Figure 16:
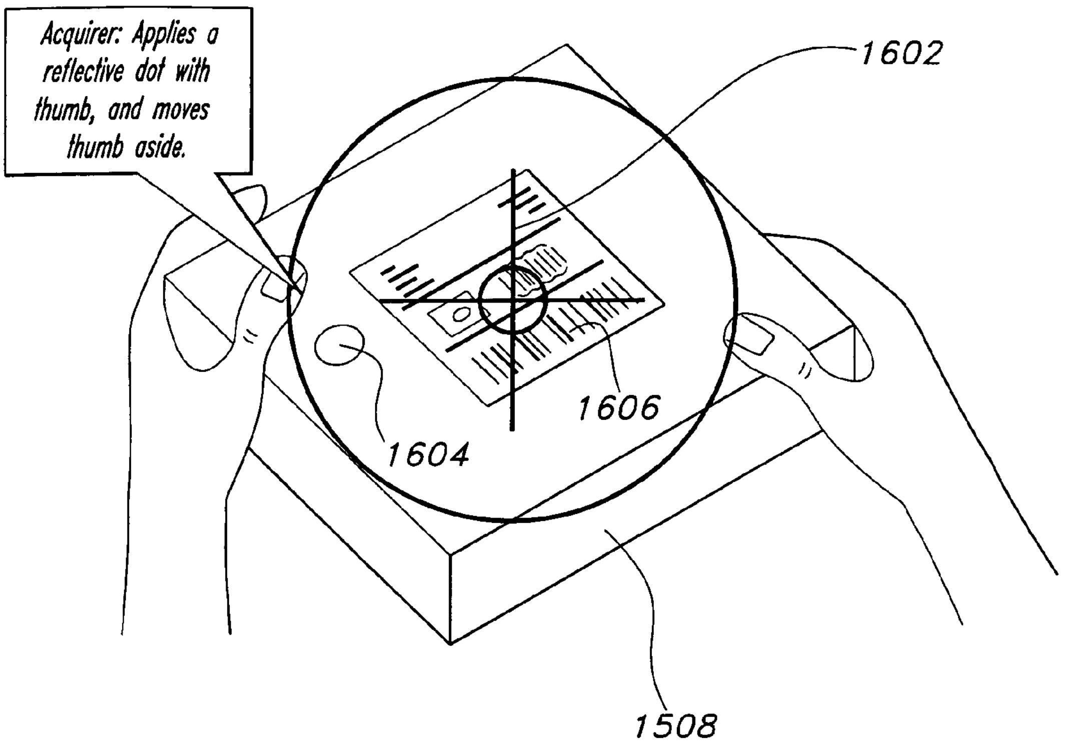
FIG. 16 shows an Acquirer aiming a target that is displayed in the see-through display of the data acquisition and display device at an item's label and placing an adhesive passive beacon near the label to trigger the capture of the label image by an image camera.

The Acquirer 1502 is positioned near the parcel container unload area 1506 of the facility and images the shipping label of each parcel 1508. As shown in FIG. 16, the Acquirer 1502 aims a target 1602 that is displayed in the see-through display 204 of the data acquisition and display device 200 and places a passive beacon such as, for example, an adhesive reflective passive beacon 1604 near the label 1606. The passive beacon 1604 is covered and uncovered thereby "winking" the passive beacon 1604 at the beacon detection device 208 of the data acquisition and display device 200 and triggering the capture of the label image by the image camera 206. In other embodiments (not shown), label information may be captured by over-the-belt label readers or other such devices, as they are known in the art.

In a registration step, the optical tracking system 1402 detects the appearance of a passive beacon 1604 through the fixed detectors such as, for example, the fixed cameras 108 and receives a notification event from a data acquisition and display device 200 that assigns a logical ID value to the passive beacon 1604. The optical tracking system 1402 begins tracking the passive beacon 1604 and sends a track lock-on acknowledgement to the data acquisition and display device 200.

Figure 17:
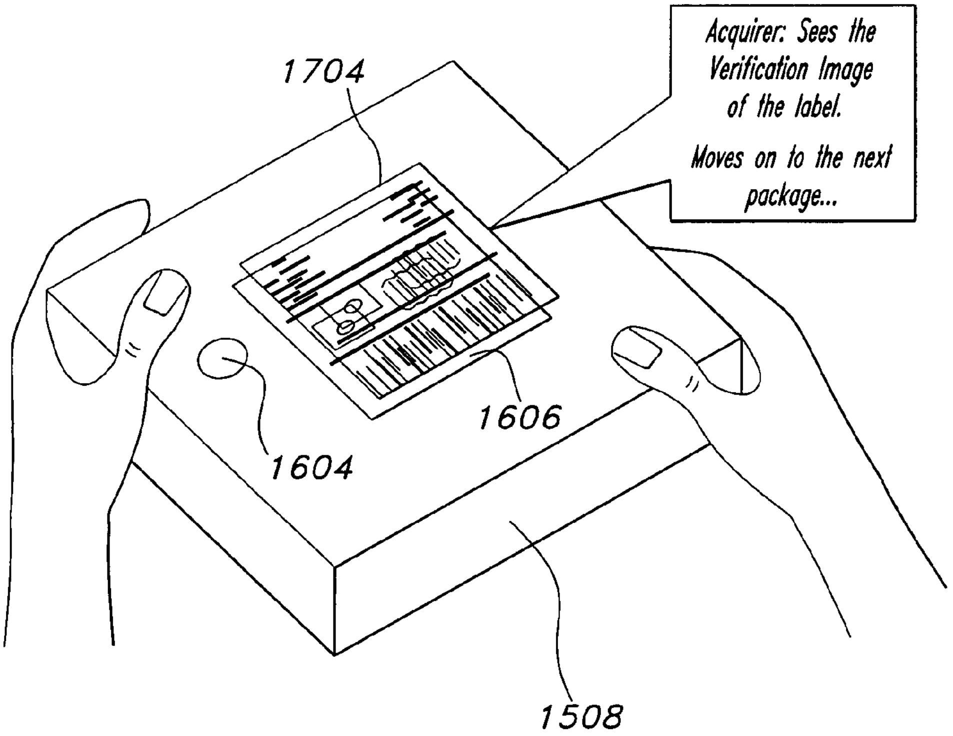
FIG. 17 shows a high-contrast copy of the captured image that is displayed in the Acquirer's see-through display so if the captured image appears fuzzy, distorted, or otherwise unclear, the Acquirer may re-capture the image.

As shown in FIG. 17, in this embodiment, a high-contrast copy of the captured image 1704 is displayed in the Acquirer's 1502 see-through display 204 to indicate that the label information has been captured. If the captured image 1704 appears fuzzy, distorted, or otherwise unclear, the Acquirer 1502 may re-capture the image 1704. The see-through display 204 of the data acquisition and display device 200 will also display a confirmation to the Acquirer 1502 that the tracking process for the item has begun and that the Acquirer 1502 may move on to the next parcel. If the Acquirer 1502 does not receive the confirmation or if the images need to be re-captured, then the passive beacon 1604 should once again be "winked" in order to repeat the acquisition cycle. If confirmation is received and the image does not need to be re-captured, the item is placed on a conveyor system 1512 with the passive beacon 1604 facing the fixed cameras 108.

While the acquired parcels 1508 travel in either a singulated or non-singulated manner on the conveyor 1512, the business application uses the decoded label data acquired from the image to determine appropriate handling instructions for each parcel 1508. If the label has insufficient coded data, then the image from the label is transferred to a key-entry workstation. Using the label image, the key-entry personnel will gather the information needed to handle the package.

Figure 18:
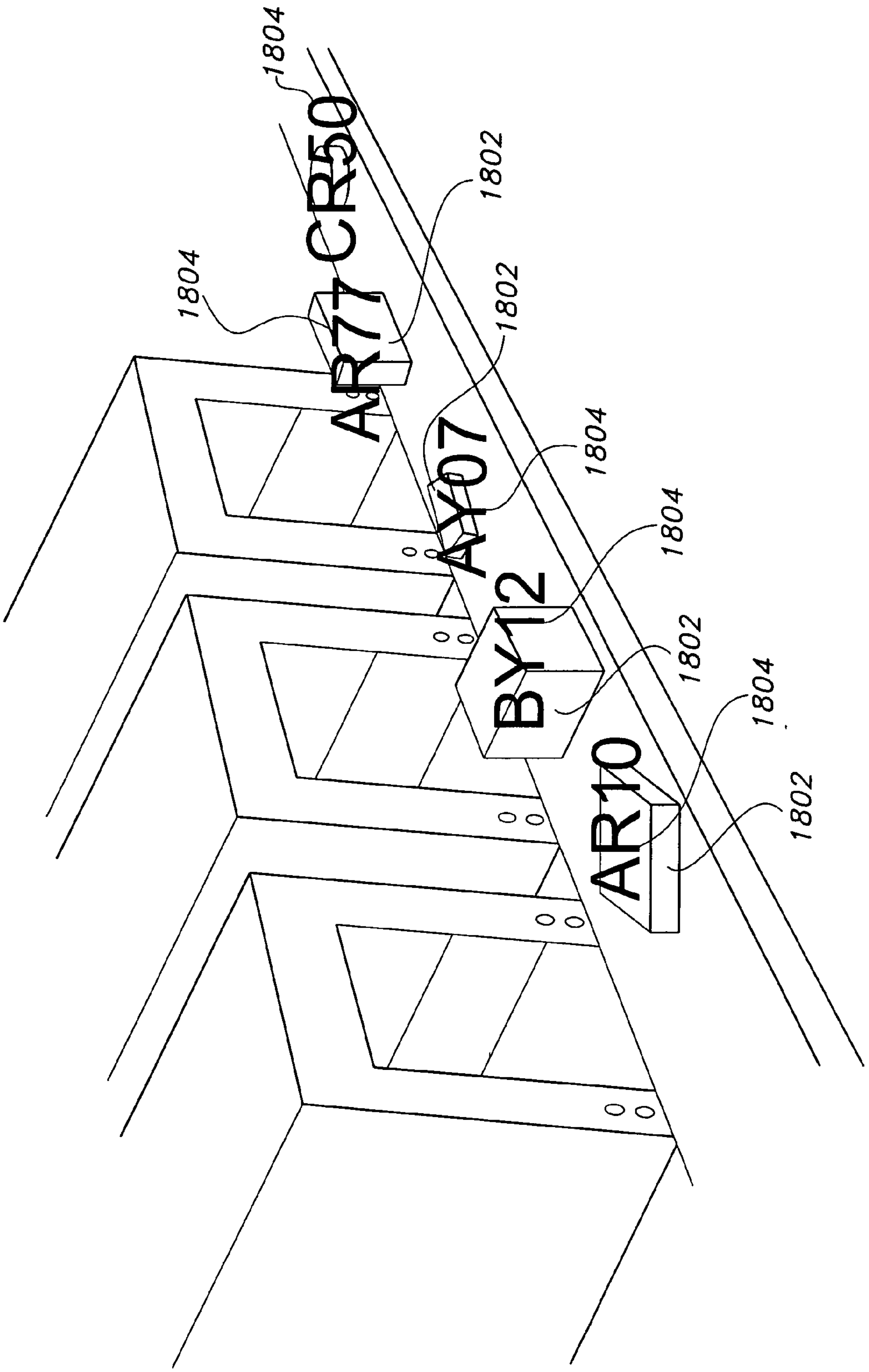
FIG. 18 shows exemplary parcels on a conveyer that have come within the Sorter's field of view and exemplary superimposed handling instructions proximately on or about parcels that are allocated to that Sorter in an embodiment of the invention.

Each Sorter 1504 wearing a data acquisition and display device 200 has a defined field of view (FOV) 1510, as shown in FIG. 15. Once one or more parcels 1508 on the conveyer 1512 comes within the Sorter's FOV 1510, as shown in FIG. 18, the Sorter 1504 will see that package's 1802 super-imposed handling instructions 1804 proximately floating over or about the packages 1802 that are allocated to that Sorter 1504. The Sorter 1504 will load each of these packages 1508 according to the super-imposed handling instructions 1804. In one embodiment, tracked packages 1508 on the conveyor 1512 that have somehow lost their handling instructions have a special indicator (not shown) imposed on them and can be re-registered by "winking" their passive beacon 1604 thus causing the super-imposed handling instructions 1804 to appear to wearers of a data acquisition and display device 200. In some embodiments, tracked packages 1508 that are not allocated to the immediate area of a Sorter 1504 have a special symbol (not shown) super-imposed on them. This indicates that the package is being tracked, but that it is not for loading in that Sorter's 1504 immediate area. In some embodiments, packages that have no handling instructions or special symbol associated with them provides indication that the package was never registered by the Acquirer 1502 or that the package has been flipped or otherwise lost its passive beacon

1604. In one embodiment, parcel information is displayed sequentially as each package 1508 enters a Sorter's 1504 field of view 1510 or work area, whereas in other embodiments information is displayed for all parcels 1508 within the Sorter's 1504 field of view 1510 or work area. The parcels 1508 may be singulated or non-singulated.

Figure 19:
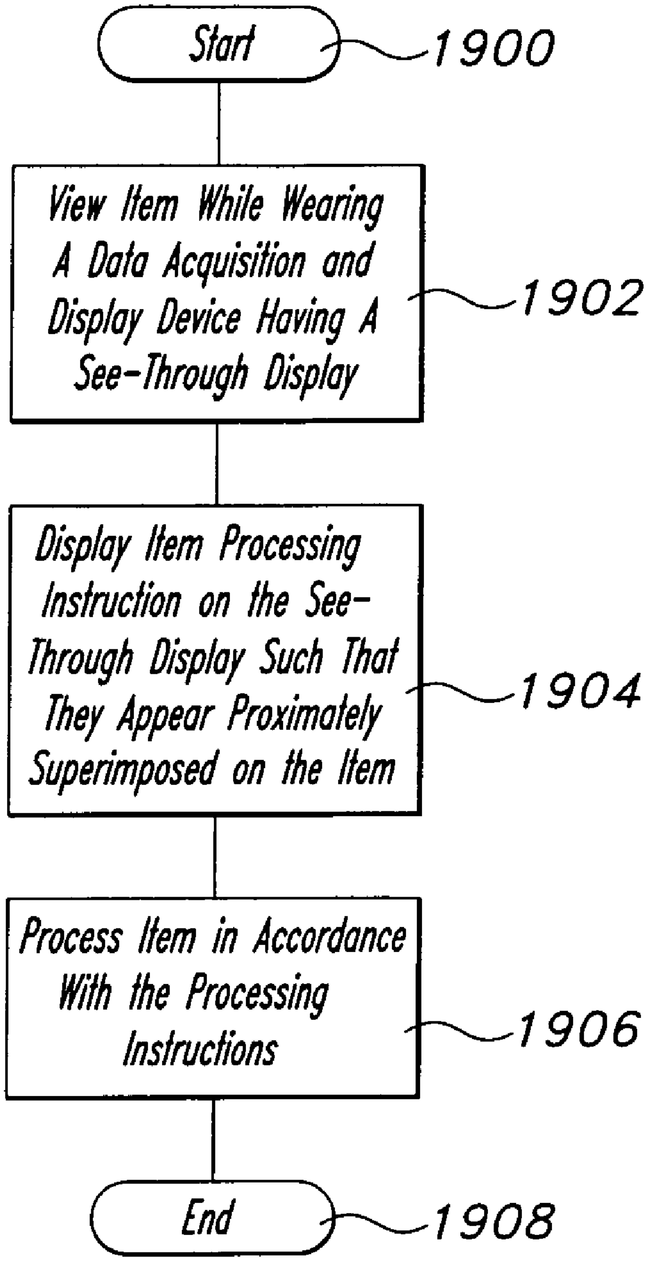
FIG. 19 is a flowchart describing the steps for a method of processing an item in an embodiment of the invention.

FIG. 19 is a flowchart describing the steps for a method of processing an item in an embodiment of the invention. The steps include beginning the process at Step 1900. At Step 1902, an item is viewed while wearing a data acquisition and display device having a see-through display. Step 1904 involves displaying processing instructions on the see-through display in a manner such that the processing instructions appear proximately superimposed on the item. In Step 1906, the items are processed in accordance with the processing instructions. The process ends at Step 1908. Such a process as described in FIG. 19 may be used for the processing of mail and parcels, among other uses.

FIG. 20 is also a flowchart describing the steps for a method of processing an item in another embodiment of the invention. The process of FIG. 20 begins at Step 2000. At Step 2002 an item is tracked with a tracking system as the item's location changes. At Step 2004, the orientation and position of a wearer of a data acquisition and display device having a see-through display is determined. At Step 2006, it is determined which items are in the field of view of the see-through display of the data acquisition and display device. In Step 2008, an item is viewed through the see-through display of the data acquisition and display device. In Step 2010, processing instructions relevant to the item are displayed on the see-through display in a manner such that the processing instructions appear proximately superimposed on the item. In Step 2012, the item is processed in accordance with the processing instructions. The process ends at Step 2014.

FIG. 21 is a flowchart describing a method of displaying information about one or more items in a see-through display of a data acquisition and display device in an embodiment of the invention. The process begins at Step 2100. At Step 2102, orientation and position information about a wearer of the data acquisition and display device is captured. At Step 2104, a field of view of the see-through display is determined from the captured orientation and position information. At Step 2106, information is displayed on the see-through display about the items in the field of view of the see-through display such that the information appears to be proximately superimposed on the items when the items are viewed through the see-through display. The process ends at Step 2108. Such a process as described in FIG. 21 may be used for the processing of mail and parcels, among other uses.

FIG. 22 is a flowchart that describes a method of displaying information in a see-through display of a data acquisition and display device in another embodiment of the invention. The process begins at Step 2200. In Step 2202, data about an item is captured by, for example, an information gathering device such as the image device 126. In Step 2204, information and instructions about the item are determined from the captured data. In Step 2206, orientation and position information about a wearer of the data acquisition and display device is captured by, for example, the beacon detection device 116. In Step 2208, a field of view of the see-through display of the data acquisition and display device is determined from the captured orientation and position information. In Step 2210, information and instructions are displayed on the see-through display about the item in the field of view of see-through display such that the information and instructions appear to be proximately superimposed on the item when the item is viewed through the see-through display. The process ends at Step 2212.

FIG. 23 is a flowchart describing a method of optically tracking one or more items in an embodiment of the invention. The process begins at Step 2300. At Step 2302, a source of energy such as, for example, a light, magnetic waves, electronic transmission, etc. is provided. In Step 2304, a passive beacon such as, for example, a retro-reflective dot or other shape comprised or retro-reflective material is placed on or associated with an item. The passive beacon is activated by the source of energy or said beacon reflects energy from the source of energy. In Step 2306, two or more fixed detectors such as, for example, fixed cameras having known fixed locations relative to one another are provided with each fixed camera having a defined field of view and capable of detecting energy transmitted or reflected from the passive beacon if the passive beacon is in the fixed camera's field of view. In Step 2308, the location of the passive beacon is computed from the energy received by the two or more fixed cameras from the passive beacon as the location of the item changes. The process ends at Step 2310. The process as described above may be used for the optical tracking of mail and parcels, among other uses.

FIG. 24 is a flowchart describing a method of optically tracking one or more items in another embodiment of the invention. The process begins at Step 2400. At Step 2402, a source of energy such as, for example, a light, magnetic waves, electronic transmission, etc. is provided. In Step 2404, a passive beacon such as, for example, a retro-reflective dot or other shape comprised or retro-reflective material is placed on an item. The passive beacon is activated by the source of energy or said beacon reflects energy from the source of energy. In Step 2406, two or more fixed detectors such as, for example, fixed cameras having known fixed locations relative to one another are provided with each fixed camera having a defined field of view and capable of detecting energy transmitted or reflected from the passive beacon if the passive beacon is in the fixed camera's field of view. In Step 2408, the location of the passive beacon is computed from the energy received by the two or more fixed cameras from the passive beacon as the location of the item changes. In Step 2410, a data acquisition and display device having a see-through display, an image device such as, for example, an image camera or an RFID reader, a local computer, and a beacon detection device such as, for example, a beacon camera, is provided. In Step 2412 image data about the item is captured with the image device. The image data may be, for example, a mailing label having both machine-readable and human-readable elements, or an RFID tag, or a combination thereof. In Step 2414, information about the item is determined from the image data with the local computer. In Step 2416, orientation and position information about the data acquisition and display device is captured with the beacon detection device. In Step 2418, a field of view of the see-through display is determined from the captured orientation and position information. In Step 2420, it is determined if the item is in the field of view of the see-through display from the location of the passive beacon. In Step 2422, information and instructions are displayed on the see-through display about the item if the item is in the field of view of see-through display such that the information and instructions appear to be proximately superimposed on the item when the item is viewed through the see-through display. The process ends at Step 2424.

FIG. 25 is a flowchart describing a method of tracking items in an embodiment of the invention. The process begins with Step 2500. In Step 2502, a data acquisition and display device having an information gathering device to capture data about an item is provided. The information gathering device may be, for example, an image camera, an RFID reader, etc. The captured data may come from a mailing label and/or an RFID tag. Also provided is an active beacon detection device to capture orientation and position information about a wearer of the data acquisition and display device, a see-through display to display information and instructions about the item, and a local computer in communication with the information gathering device, active beacon detection device, and see-through display. The local computer decodes data from the information gathering device, computes the orientation and position of the wearer of the data acquisition and display device from the orientation and position information captured by the active beacon detection device, and provides information and instructions to be displayed in the see-through display about items in the field of view of the data acquisition and display device.

In Step 2504 a tracking system is provided. The tracking system is comprised of a source of energy such as, for example, a light. A passive beacon such as, for example, a retro-reflective dot or an RFID tag is located on or associated with the item that is activated by the source of energy or the passive beacon reflects energy from the source of energy. Two or more fixed detectors are provided with each having a defined field of view that are each capable of detecting energy transmitted or reflected from the passive beacon if the passive beacon is in the fixed detector's field of view. A passive beacon location tracking computer is in communication with the two or more fixed detectors. The passive beacon location tracking computer knows the location of each fixed detector relative to the other fixed detectors and the passive beacon location tracking computer is able to compute the location of the passive beacon from the energy received by the two or more fixed detectors from the passive beacon as the location of the item changes.

In Step 2506, information about an item's location is provided to the local computer from the tracking system so that the local computer can determine what items are in the data acquisition and display device's field of view.

In Step 2508, information about those items in the field of view of the data acquisition and display device is displayed in the see-through display such that the instructions and information appear proximately superimposed on the items. The process ends at Step 2510.

FIG. 26 is a flowchart that describes a method of computing the orientation and position of a wearer of a data acquisition and display device in an embodiment of the invention. The process begins at Step 2600. In Step 2602, two or more unique active beacons having known locations relative to one another are provided. In Step 2604, a data acquisition and display device having a beacon detection device with a defined field of view is provided. At Step 2606, two or more unique active beacons within the beacon detection device's field of view are sensed by the beacon detection device. At Step 2608, the location of the data acquisition and display device relative to the known location of the two or more unique active beacons within the field of view of the beacon detection device is determined. The process ends at Step 2610.

Embodiments of the invention may be used in various applications in parcel and mail sorting and processing. For instance, in one embodiment, certain people with a sorting/processing facility may be able to see different information about items than what other wearers of a data acquisition and display device may be able to see. Examples include high-value indicators, hazardous material indicators, and items requiring special handling or adjustments. Security may also be facilitated by the use of embodiments of the system as items are constantly tracked and their whereabouts recorded by the tracking system as they move through a facility. And, as previously described, embodiments of the invention may be used to track item flow through a facility such that the flow may be enhanced or optimized.

Embodiments of the invention may also be used in applications other than parcel or mail sorting and processing. Many applications involving queues and queuing may make use of embodiments of the system. For instance, air traffic controllers managing ground traffic at an airport may have information about flights superimposed proximately about or over the actual airplanes as they are observed by a controller wearing a data acquisition and display device. Similarly, train yard operators and truck dispatchers may have information about the trains or trucks, their contents, etc. displayed on the actual trains and/or trucks. Furthermore, sorting facilities other than mail and parcel sorting facilities may make use of the embodiments of the invention. For instance, embodiments of the invention may be used in the sorting of baggage at an airport whereby sorting instructions will be displayed to sorters wearing a data acquisition and display device.

Complex facility navigation and maintenance activities may also make use of embodiments of the invention. A wearer of a data acquisition and display device may be able to see instructions guiding them to a particular destination. Examples include libraries, warehouses, self-guided tours, large warehouse-type retail facilities, etc. Routine maintenance of apparatuses may be improved by having maintenance records appear to the wearer of a data acquisition and display device when the wearer looks at the device in question.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of computing the orientation and position of a wearer of a data acquisition and display device, comprising:

providing two or more unique active beacons having known locations relative to one another;

providing a data acquisition and display device to be worn by the wearer, the data acquisition and display device having a beacon detection device with a defined field of view, said defined field of view substantially corresponding with a field of view of the wearer;

sensing two or more unique active beacons within the beacon detection device's field of view;

determining the location of the data acquisition and display device relative to the known location of the two or more unique active beacons within the field of view of the beacon detection device; and determining from said location and said defined field of view whether one or more items having passive beacons thereon for tracking purposes are within said defined field of view as said one or more items' positions change.

2. The method of claim 1, further comprising:

providing an inertial sensor on the data acquisition and display device, wherein the inertial sensor provides orientation information of the data acquisition and display device during movement of the data acquisition and display device.

3. A computer program product comprised of code that is executable by a processor of a computing device for processing tasks for determining the orientation and position of a wearer of a data acquisition and display device, said computer program product comprising:

a first executable portion operating on said processor that determines the location of a data acquisition and display device having a beacon detection device with a defined field of view relative to locations of two or more unique active beacons by receiving signals from said data acquisition and display device indicating the presence of the two or more unique active beacons within the beacon detection device's field of view, wherein each unique active beacon has a known location relative to one another and the field of view of the beacon detection device substantially corresponds to the field of view of the wearer of the data acuuisition and display device; and a second executable portion operating on said processor that determines from the location of said data acquisition and display device and said defined field of view of said data acquisition and display device whether one or more items having passive beacons thereon for tracking purposes are within said defined field of view as said one or more items: positions change.

4. The computer program product of claim 3 further comprising a third executable portion operating on said processor that determines the orientation of the data acquisition and display device from a signal provided by an inertial sensor on the data acquisition and display device, wherein the inertial sensor provides orientation information of the data acquisition and display device during movement of the data acquisition and display device.

* * * * *

UNITED STATES PATENT AND TRADEMARK OFFICE

CERTIFICATE OF CORRECTION

PATENT NO. : 7,201,316 B2
APPLICATION NO. : 11/386152
DATED : April 10, 2007
INVENTOR(S) : Anderson et al.

It is certified that error appears in the above-identified patent and that said Letters Patent is hereby corrected as shown below:

Column 24,

Line 4, “acuuisition” should read --acquisition--.

Signed and Sealed this

Thirty-first Day of July, 2007

JON W. DUDAS

*Director of the United States Patent and Trademark Office*